(12) United States Patent
Yamazaki

(10) Patent No.: US 11,099,046 B2
(45) Date of Patent: Aug. 24, 2021

(54) MONITORING APPARATUS FOR GRAPHICALLY DISPLAYING AND INDICATING A HISTORY OF INTEGRATED FLOW AMOUNT OF GAS FLOW METER

(71) Applicant: Keyence Corporation, Osaka (JP)

(72) Inventor: Kentaro Yamazaki, Osaka (JP)

(73) Assignee: KEYENCE CORPORATION, Osaka (JP)

( * ) Notice: Subject to any disclaimer, the term of this patent is extended or adjusted under 35 U.S.C. 154(b) by 154 days.

(21) Appl. No.: 16/574,161

(22) Filed: Sep. 18, 2019

(65) Prior Publication Data

US 2020/0209027 A1     Jul. 2, 2020

(30) Foreign Application Priority Data

Dec. 28, 2018  (JP) .............................. JP2018-248709

(51) Int. Cl.
| | |
|---|---|
| *G01F 15/06* | (2006.01) |
| *G01F 15/07* | (2006.01) |
| *G01F 1/66* | (2006.01) |
| *G01F 15/075* | (2006.01) |
| *G01M 3/28* | (2006.01) |

(52) U.S. Cl.
CPC ............ *G01F 15/075* (2013.01); *G01F 1/662* (2013.01); *G01F 15/068* (2013.01); *G01M 3/2807* (2013.01)

(58) Field of Classification Search
None
See application file for complete search history.

(56) References Cited

U.S. PATENT DOCUMENTS

2019/0011303 A1*  1/2019  Hashimoto ............. G01F 1/667

FOREIGN PATENT DOCUMENTS

| JP | 2004-347352 A |   | 12/2004 |   |
|---|---|---|---|---|
| JP | 2017-146803 A |   | 8/2017 |   |
| JP | 2019-194829 | * | 11/2019 | ............. G06Q 30/04 |

OTHER PUBLICATIONS

U.S. Appl. No. 16/574,157, filed Sep. 18, 2019 (102 pages).

* cited by examiner

*Primary Examiner* — Harshad R Patel
(74) *Attorney, Agent, or Firm* — Kilyk & Bowersox, P.L.L.C.

(57) ABSTRACT

To provide an apparatus for monitoring a fluid flow rate, which is capable of performing monitoring without a data deficit, and displays information on a trend of a past history. A monitoring apparatus accepts, from the flow meter, integrated flow amount data for every day-and-time section, and a current flow rate, and graphically displays, on the basis of the integrated flow amount data for every day-and-time section, an integrated flow amount corresponding to each day-and-time section, on the basis of the integrated flow amount data for every day-and-time section including the current day-and-time and for every another plurality of continuous day-and-time sections.

10 Claims, 28 Drawing Sheets

(LEAK AMOUNT GRAPH + NUMERICAL VALUE DISPLAY)

FIG. 27

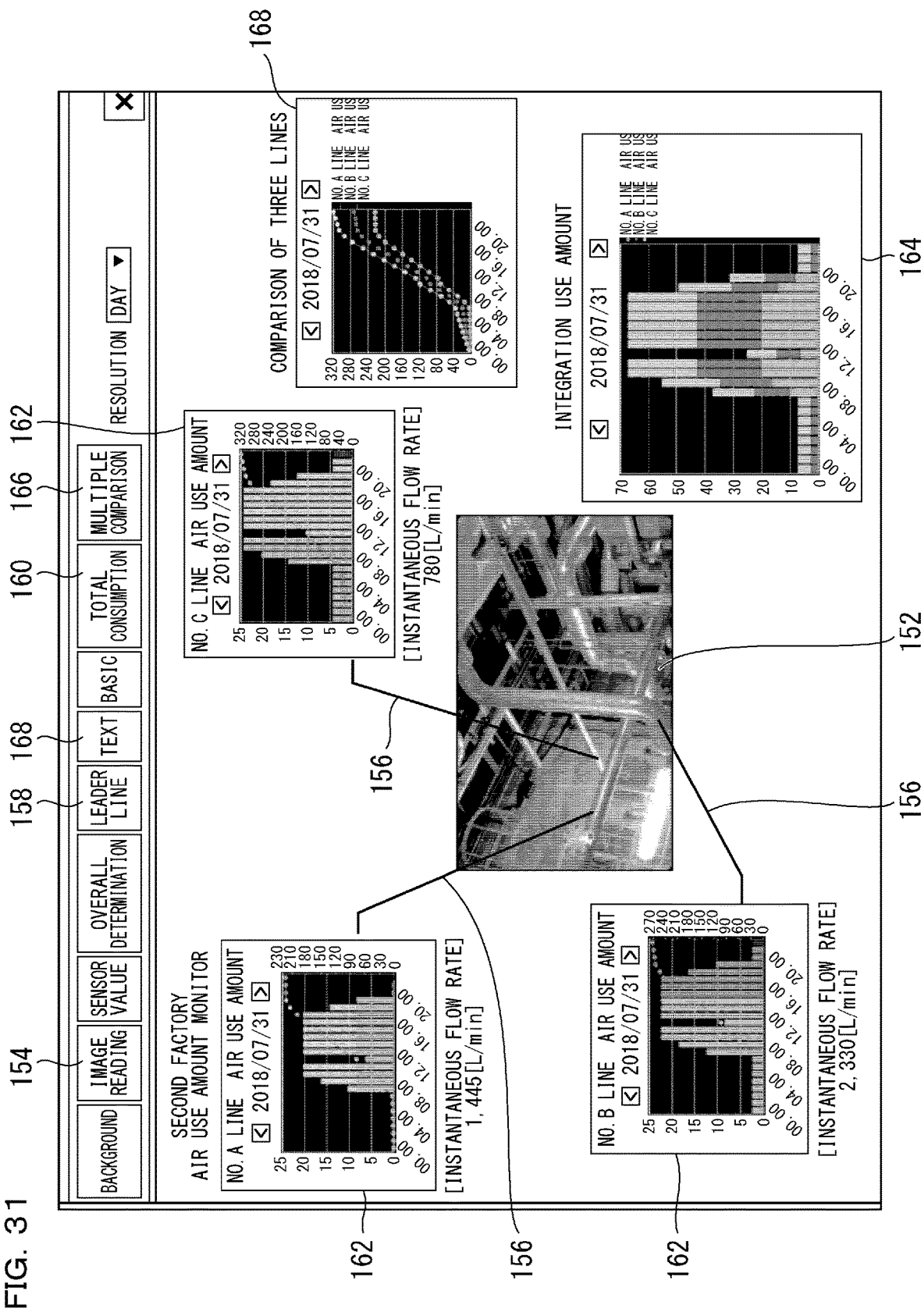

MONITORING APPARATUS FOR GRAPHICALLY DISPLAYING AND INDICATING A HISTORY OF INTEGRATED FLOW AMOUNT OF GAS FLOW METER

CROSS-REFERENCE TO RELATED APPLICATIONS

The present application claims foreign priority based on Japanese Patent Application No. 2018-248709, filed Dec. 28, 2018, the contents of which is incorporated herein by reference.

BACKGROUND OF THE INVENTION

1. Field of the Invention

The present invention relates to an apparatus for monitoring a fluid flow rate.

2. Description of Related Art

JP-A-2004-347352 discloses a flow meter that is provided with a display unit, and a measured instantaneous flow rate is numerically displayed on the display unit of this flow meter, for example. In a case where a plurality of the flow meters are mounted in a factory, for example, a PLC, is incorporated into an apparatus that monitors the flow meters.

JP-A-2017-146803 discloses a monitoring apparatus that uses a PLC, and discloses a monitoring screen on which a flow rate measured by a flow meter is displayed.

There are many facilities that use the compression air as a drive source in a factory. The compression air is supplied to the in-house facilities from a compressor through a pipe that is laid in the factory, and in that case, electric power energy corresponded to the compression air to be generated is applied to the compressor.

In order to appropriately manage the energy that is used in the factory, management of the compression air to be used is one of important elements.

In order to quantitatively manage the compression air to be used, constructed is an integral system in which the flow meters as disclosed in JP-A-2004-347352 are disposed to suitable places of the pipe, the plurality of flow meters are connected to a network, and a higher-level apparatus adds up measurement data of the respective flow meters.

However, in order to collect the measurement data of the flow meters over the long term by the higher-level apparatus, the higher-level apparatus needs to be connected thereto and operated all the time. When the operation of the higher-level apparatus has been stopped in the middle of the night or on a holiday, for example, or a failure has occurred in the connection with the flow meter, a deficit portion is generated in the collected data.

SUMMARY OF THE INVENTION

An object of the present invention is to provide an apparatus for monitoring a fluid flow rate, which is capable of performing monitoring without a data deficit and displays information on a trend of a past history.

According to the present invention, the abovementioned technical problem can be solved by providing an apparatus for monitoring a fluid flow rate, which is connected to a flow meter including a flow rate measurement unit configured to operate by electric power to be supplied from an external power supply, and measure a fluid in a pipe; a real-time clock configured to be connected to a power supply circuit that provides electric power when the electric power is not supplied from the external power supply, hold current day-and-time data regardless of whether the electric power is supplied from the external power supply, and update the current day-and-time data in response to current day-and-time; a calculation unit configured to calculate, on the basis of the flow rate measured by the flow rate measurement unit and the current day-and-time data obtained from the real-time clock, integrated flow amount data for every day-and-time section set in advance; and a storage unit configured to store therein the integrated flow amount data for every calculated day-and-time section in association with the day-and-time section, and which includes a unit configured to accept the integrated flow amount data for every day-and-time section stored in the storage unit, and the flow rate measured by the flow rate measurement unit, from the flow meter; a screen generation unit configured to generate, on the basis of the integrated flow amount data for every day-and-time section stored in the storage unit, an integrated flow amount graph screen including a day-and-time section including the current day-and-time and a plurality of day-and-time sections continuous to the day-and-time section, and graphically displaying an integrated flow amount corresponding to each day-and-time section in a past day-and-time section in the plurality of the day-and-time sections, on the basis of the integrated flow amount data set in advance for every day-and-time section; and a display unit configured to display the integrated flow amount graph screen.

The flow meter that is connected to the monitoring apparatus in the present invention is provided with a clock that ticks away the real-time. Further, time information of this clock is stored in association with the measured flow rate. In other words, in the flow meter, integrated flow amount data for every day-and-time section is stored in association with the day-and-time section. Accordingly, for example, information indicating a history in an arbitrary constant period, in other words, an integrated flow amount or the like can be easily generated. A personal computer (PC) on which a monitoring dedicated program is installed, for example, as a monitoring apparatus, receives the information, generates an integrated flow amount graph screen on the basis of the information from the flow meter, and displays the integrated flow amount graph screen.

Accordingly, the PC is not required to constantly connect to the flow meter. Moreover, the PC can be connected to the network if necessary, create a display screen on the basis of the information received from the flow meter, and display the display screen. Accordingly, the PC can display the past history without a data deficit.

This past history can be generated, in the flow meter, on the basis of the integration of data in association with the time information, by the internal processing of the flow meter. Accordingly, the PC can cause the display unit to display the integrated use amount in an arbitrary period that the user requests. The user sees a display screen in which an integrated flow amount of yesterday and an integrated flow amount of today can be compared, for example, thereby making it possible to know a difference between the use amounts of yesterday and today. Moreover, integrated flow amounts on Monday one week ago and on Monday this week are simultaneously displayed on the PC, thereby making it possible to know a trend in a use status.

Functional effects and further objects in the present invention may be apparent from the detailed explanations for preferred embodiments below.

BRIEF DESCRIPTION OF THE DRAWINGS

FIG. 27 illustrates a monitoring screen created by a user with a monitoring PC on which a dedicated program is installed;

FIG. 31 is a diagram for explaining an editing function that is prepared in the dedicated program having been installed on the monitoring PC.

DESCRIPTION OF EMBODIMENT

Embodiment

Figure 1:
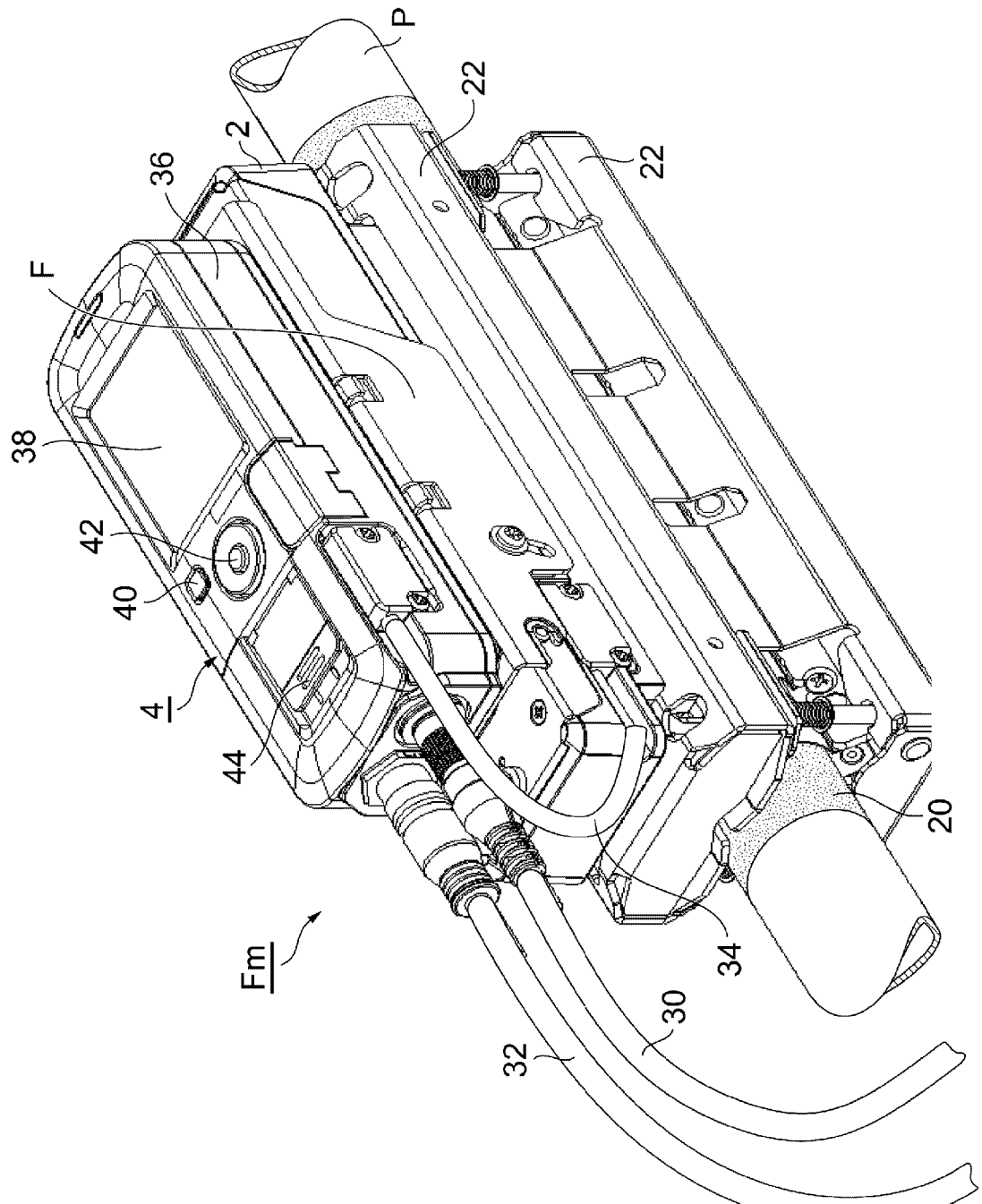
FIG. 1 is a perspective view illustrating a state where a clamp-on type ultrasonic flow meter to which the present invention is applied is mounted to a pipe.
Figure 2:
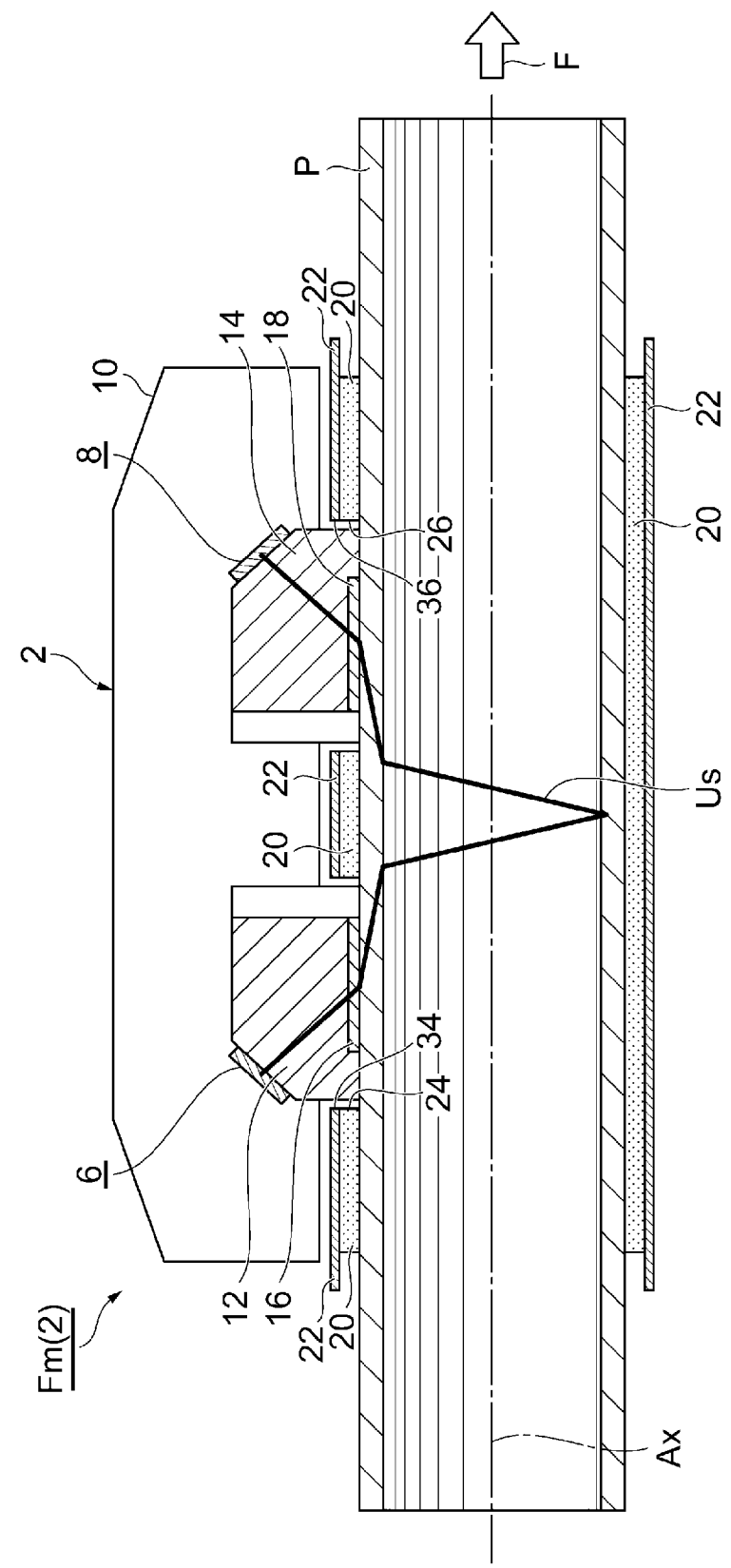
FIG. 2 is a cross-sectional view of a sensor main body of the gas flow meter illustrated in FIG. 1.
Figure 3:
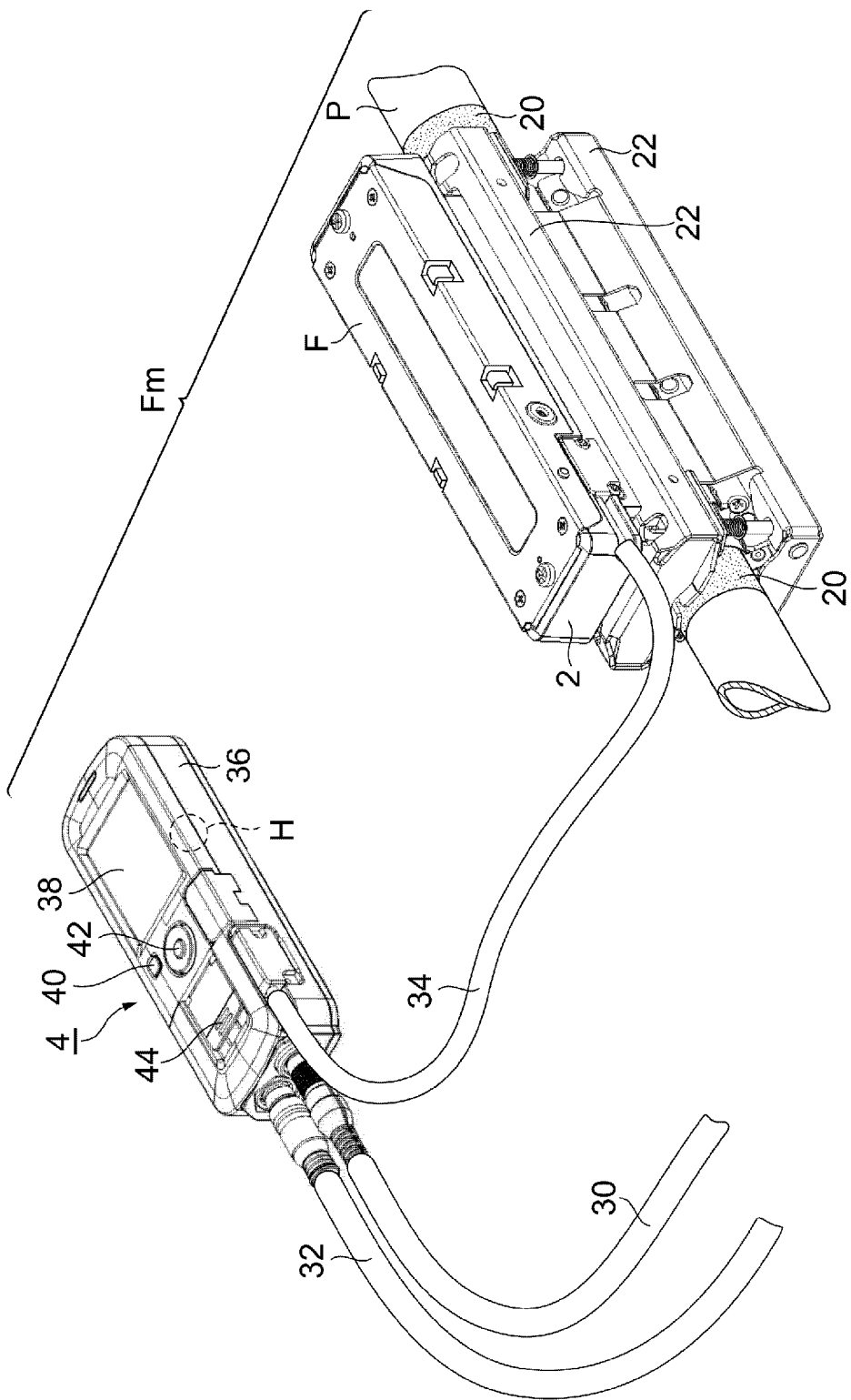
FIG. 3 is a perspective view for explaining a use form in which a display unit is used in a state of the display unit being isolated from the sensor main body.

An embodiment of the present invention is explained below with reference to the attached drawings. FIG. 1 is a perspective view illustrating a state where a clamp-on type ultrasonic flow meter to which the present invention is applied is mounted to a pipe, and FIG. 2 is a cross-sectional view of a sensor main body of the gas flow meter illustrated in FIG. 1. FIG. 3 is a perspective view for explaining a use form in which a display unit is used in a state of the display unit being isolated from the sensor main body.

A clamp-on type ultrasonic flow meter Fm in the embodiment is designed so as to be suitably applied to the measurement of the flow rate of the compression air and the nitrogen gas. When an explanation is made using the compression air as an example, with respect to operation apparatuses that use the compression air as an operation source in a factory, the gas flow meter Fm is retrofitted with a pipe P that supplies the compressed air by a compressor from a tank in which the compressed air is stored to the respective operation apparatuses.

The gas flow meter Fm includes a sensor main body 2 that is mounted to the pipe P, and a display unit 4, the display unit 4 includes a housing different from the sensor main body 2. In other words, the gas flow meter Fm is an isolation type, and the sensor main body 2 and the display unit 4 are separate-body structures. Further, the display unit 4 is detachable to the sensor main body 2. Needless to say, the gas flow meter Fm may have an integral-body shape in which the sensor main body 2 and the display unit 4 are configured as one housing, for example.

The sensor main body 2 has a function of measuring the flow rate of a gas flowing inside the pipe P, and includes first and second ultrasonic devices 6 and 8 that transmit/receive ultrasonic waves and that are embedded therein, with reference to FIG. 2. In other words, the first and second ultrasonic devices 6 and 8 are fixedly disposed in the inside of a common main body housing 10. The first and second ultrasonic devices 6 and 8 typically include piezoelectric elements.

With reference to FIG. 2, in the clamp-on type ultrasonic flow meter Fm, the first and second ultrasonic devices 6 and 8 embedded in the sensor main body 2 are disposed being apart from each other in a direction of an axis line Ax of the pipe P, on a bus-bar of the pipe P. In other words, the sensor main body 2 is a clamp-on type flow meter of a so-called V-arrangement scheme or a reflection arrangement. In FIG. 2, a reference numeral Us schematically indicates a path of ultrasonic signals that are transmitted and received between the first and second ultrasonic devices 6 and 8. As illustrated in the drawing, the sensor main body 2 may emit ultrasonic waves so as to cross the pipe P, but is not limited thereto. The sensor main body 2 may generate a natural vibration mode of the pipe wall, preferably, Lamb waves or plate waves, in a tube wall of the pipe P. Needless to say, in this case, it should be understood that the illustrated path Us is schematically illustrated.

As a modification example, the first and second ultrasonic devices 6 and 8 that are included in the sensor main body 2 may be disposed so as to sandwich the pipe P therebetween and face each other. Specifically, the present invention is suitably applicable to a flow meter of a so-called Z-arrangement scheme in which the first ultrasonic device 6 is disposed on a first bus-bar of the pipe P, and the second ultrasonic device 8 is disposed on a second bus-bar facing the first bus-bar in a diametrical direction.

The sensor main body 2 includes a first wedge member 12 that is adjacent to the first ultrasonic device 6, and includes a second wedge member 14 that is adjacent to the second ultrasonic device 8. Moreover, the sensor main body 2 preferably includes first and second couplants 16 and 18 that are respectively adjacent to the first and second wedge members 12 and 14, and the first and second couplants 16 and 18 may preferably configure contact parts with respect to the pipe P. In order to improve the mounting workability, preferably, the first and second couplants 16 and 18 may preferably include solid couplants. A grease may be interposed between the first and second couplants 16 and 18 and the pipe P, but no grease may be preferable.

In FIG. 2, a reference numeral 20 indicates a damping member. The damping member 20 is a sheet-like molded article having a moderate flexibility, and preferably having a prescribed thickness. The damping member 20 has a viscoelastic property, and preferably has an adhesiveness and a peel property with respect to the pipe P made of metal. When a worker moves a hand along the damping member 20, the damping member 20 is easily deformable along the surrounding of the pipe P.

The damping member 20 is disposed adjacent to the sensor main body 2, and is disposed in a state of being in contact with the pipe P and so as to surround the surrounding of the pipe P. Further, the damping member 20 is fixed to the pipe P by a damping fitting 22 that surrounds an outer circumference thereof, and is pressed against the pipe P by the damping fitting 22. In other words, the damping fitting 22 continuously maintains a pressure keeping function to the damping member 20.

The first and second ultrasonic devices 6 and 8 that are embedded in the sensor main body 2 are fixedly set to have a clearance of 1 to 15 cm, preferably 2 to 6 cm, for example, in the direction of the axis line Ax of the pipe P.

The damping member 20 and the damping fitting 22 include first and second damping windows 24 and 26 that are spaces, and the first and second damping windows 24 and 26 are positioned at positions corresponding to the first and second couplants 16 and 18.

With reference to FIG. 1 and FIG. 3, three waterproof cables 30, 32, and 34 are connected to the display unit 4. The first cable 30 includes a power supply cable that supplies power supply (for example, DC 24V) to the display unit 4, a first output cable that supplies an analog signal corresponding to the instantaneous flow rate from the display unit 4 to the outside, a second output cable that supplies a pulse signal corresponding to the integrated flow amount from the display unit 4 to the outside, and a third output cable that supplies an ON/OFF signal that is a comparison result with a threshold from the display unit 4 to the outside. The second cable 32 is an industry transmission cable, and includes, for example, an Ethernet IP communication cable or an EtherCAT (registered trademark) communication cable, a communication cable with a monitoring apparatus and an external PC, and a cable that supplies the flow rate of an object gas from the display unit 4 to the outside. The third cable 34 is a cable for connecting the display unit 4 to the sensor main body 2, and includes a cable that supplies power supply via the display unit 4 to the sensor main body 2, a cable that provides setting information to the sensor main body 2, and a cable that supplies measurement flow rate data from the sensor main body 2 to the display unit 4.

Subsequently with reference to FIG. 1 and FIG. 3, the display unit 4 has a waterproof and dustproof case 36 that configures a housing of the display unit, and the waterproof and dustproof case 36 is separately provided from the sensor main body 2. The display unit 4 further includes a color liquid crystal 38 serving as a display device against which waterproof and dustproof measures are taken, a menu button 40 to which waterproof processing is applied, and an operation button 42 to which waterproof and dustproof processing is applied, and a selection function and a determination (SET) function that are used to select a menu or an icon displayed on the color liquid crystal 38 are given to the operation button 42. The display unit 4 further includes a USB port 44, and a not-illustrated lid is closed to make the USB port 44 waterproof and dustproof. The USB port 44 is used for connection with an external personal computer (PC) 46 (FIG. 4) for monitoring and/or for setting.

With reference to FIG. 1, the display unit 4 is positioned and fixed to the sensor main body 2 via a fitting F. The display unit 4 is preferably provided with a latch hole H (FIG. 3) on a back face thereof. The fitting F is detachable to the display unit 4, and is detachable to the sensor main body 2. When the display unit 4 is detached from the sensor main body 2, the display unit 4 is used desirably in a state of being latched by applying the latch hole H to a nail provided on a pillar or the like, for example.

Figure 4:
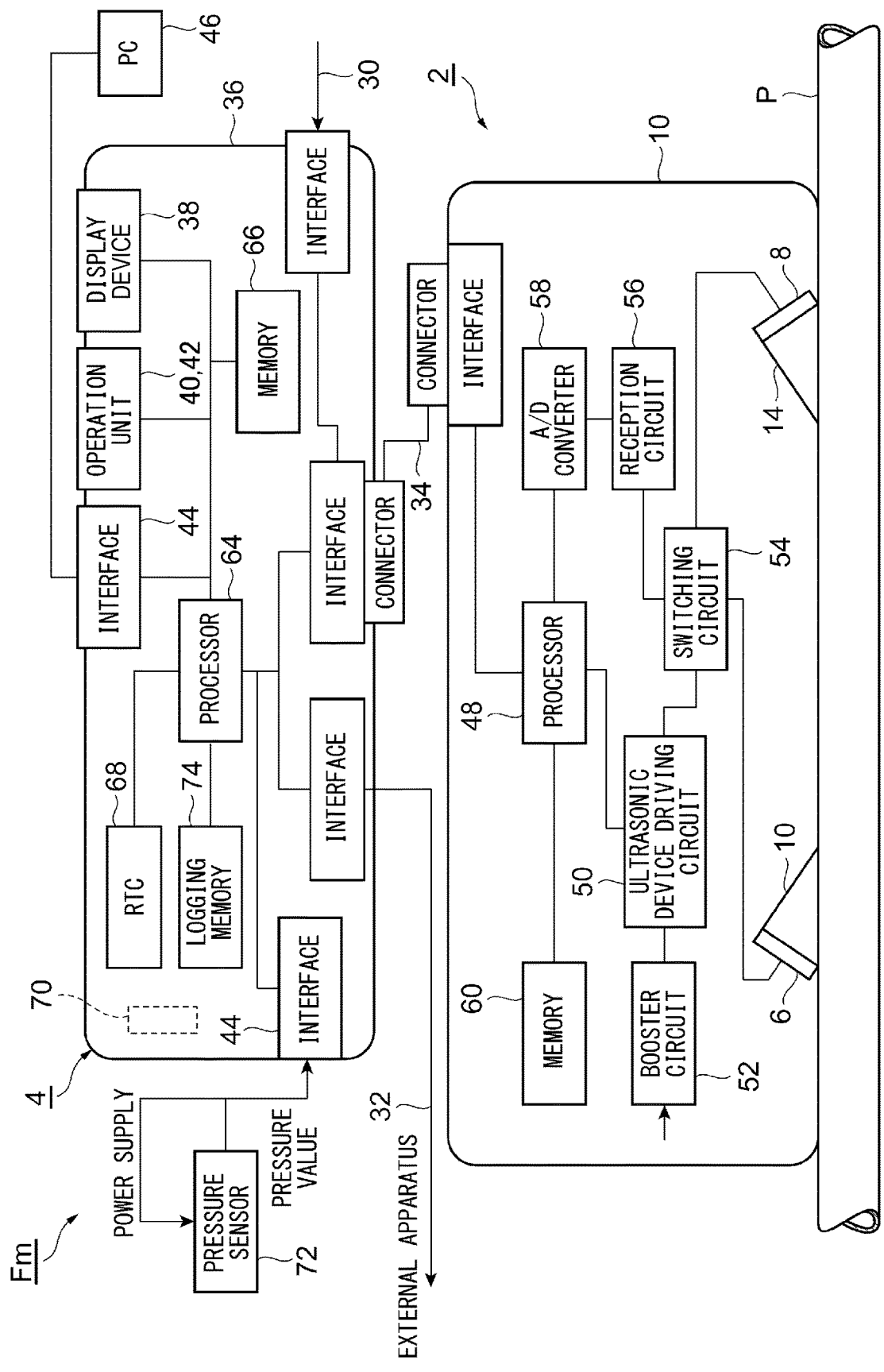
FIG. 4 is a diagram for explaining an internal structure of the sensor main body and the display unit.

FIG. 4 is a diagram for explaining an internal structure of the sensor main body 2 and the display unit 4. With reference to FIG. 4, the sensor main body 2 includes a micro processor 48 that configures a control unit of flow rate measurement, and an ultrasonic device driving circuit 50 that controls the irradiation of the first and second ultrasonic devices 6 and 8. A drive voltage from a booster circuit 52 is supplied to the ultrasonic device 6 (8). Output from the ultrasonic device driving circuit 50 is successively supplied the first and second ultrasonic devices 6 and 8 via the switching circuit 54. The switching circuit 54 is controlled to be switched in synchronization with the control of the irradiation of the first and second ultrasonic devices 6 and 8. Because of the switching circuit 54 being interposed, in a transmission state of an outgoing path, the first ultrasonic device 6 functions as a transmitter, and the second ultrasonic device 8 functions as a receiver. Similarly, in a transmission state of an incoming path, the second ultrasonic device 8 functions as a transmitter, and the first ultrasonic device 6 functions as a receiver.

Output from each of the ultrasonic devices 6 and 8 is supplied to a reception circuit 56 via the switching circuit 54. The reception circuit 56 amplifies an electric signal, and an A/D converter 58 coverts the amplified analog signal into a digital signal, which is input into the micro processor 48. The micro processor 48 communicates with a memory 60 in which a prescribed program is stored, and executes prescribed processing.

In order to compute a rate of flow flowing through the pipe P, information required for this computation is stored in the memory 60. The micro processor 48 typically aligns an outgoing path reception waveform and an incoming path reception waveform using the time of respective emission time points as an origin point, and performs waveform shape matching by causing the outgoing path reception waveform and the incoming path reception waveform to relatively displace from this aligned state in the time direction. The amount of time shift in which the degree of matching becomes maximum is determined as a propagated time difference, and a flow rate of gas is calculated on the basis of this propagated time difference.

The display unit 4 includes a micro processor 64 that is accommodated in a display unit housing separated from the sensor main body 2, in other words, the waterproof case 36 (FIG. 3). The micro processor 64 configures a control unit that controls the display, and communicates with a memory 66 in which a prescribed program and a prescribed application are stored and executes prescribed processing.

The display unit 4 further includes a real-time clock (RTC) 68 that functions as a real-time clock, and the RTC 68 operates all the time by the power supply that is supplied from the first cable 30. As a modification example, a backup battery 70 is mounted on the display unit 4, and even when supplying the power supply to the display unit 4 is stopped, the backup battery 70 may enable the RTC 68 to continuously tick away the time in real time.

For example, a pressure sensor 72 mounted to the pipe P is connected to the display unit 4 via the USB port 44, and an internal pressure value of the pipe P is input into the micro processor 64. The micro processor 64 stores the flow rate data received from the sensor main body 2 in a logging memory 74. The logging memory 74 is preferably provided with a capacity capable of recording an integrated flow amount and an integrated leak amount at least for two years.

Note that, the integrated flow amount indicates the total amount of gas having passed through the pipe P from a first time point to a second time point, and normally indicates a total amount of gas having passed through the pipe P from a time point when a reset signal is input to a current time. When the integrated flow amount is based on a volume flow amount, the integrated flow amount is a volume of the gas having passed through the pipe P, and a unit thereof is cubic meter, for example. Moreover, when the integrated flow amount is based on a mass flow amount, the integrated flow amount is a mass of the gas having passed through the pipe P, and a unit thereof is kilogram, for example. The integrated flow amount indicates the total amount of gas having passed through the pipe P from the first time point to the second time point, and thus the integrated flow amount is referred to as a use amount in some cases, in the present description.

Figure 5:
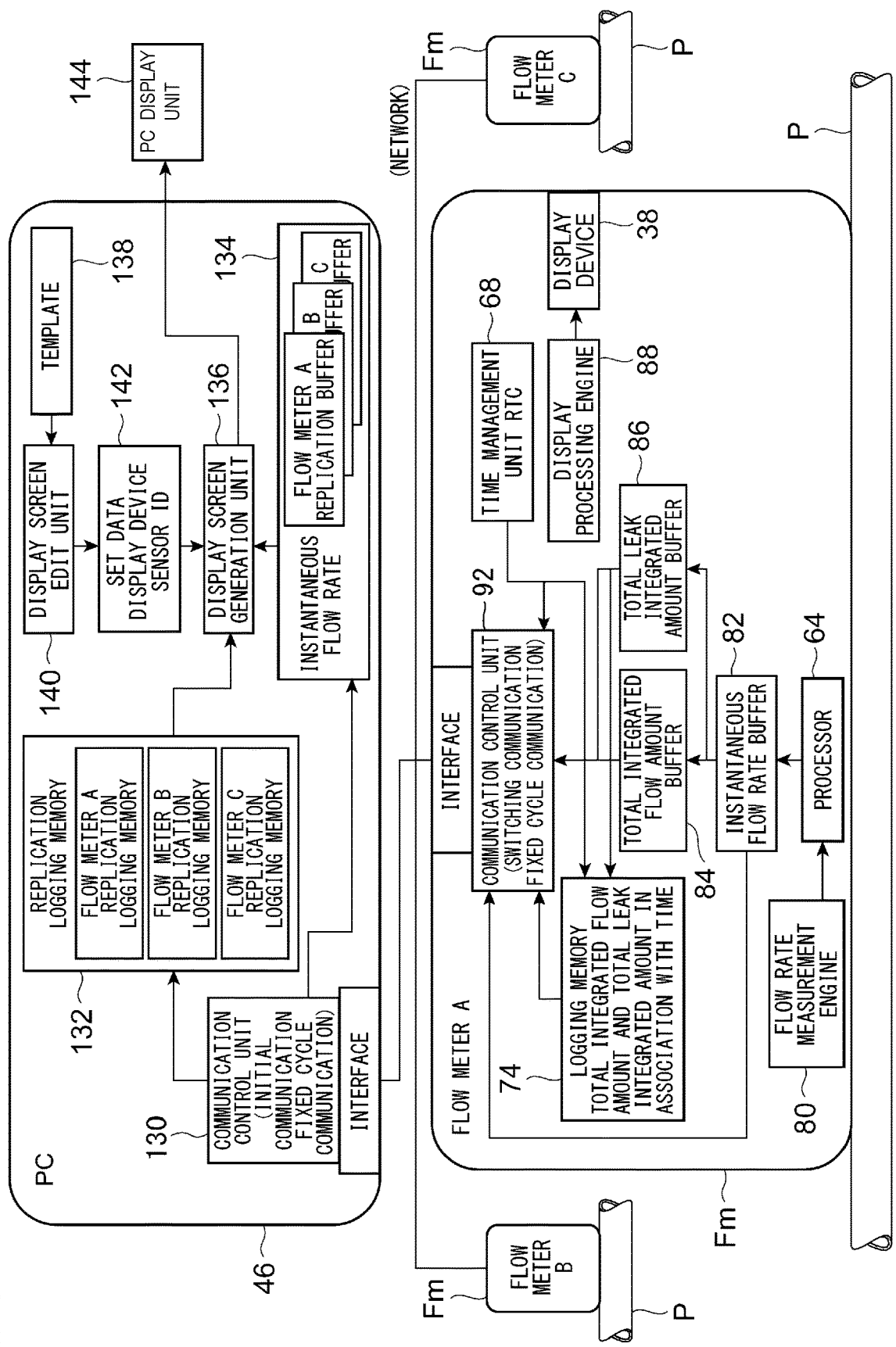
FIG. 5 is a function block diagram of the display unit.

FIG. 5 is a diagram for explaining the function of the sensor main body 2, and the flow meter Fm including the display unit 4. The flow meter Fm includes a flow rate measurement engine 80 that measures a flow rate of fluid flowing through the pipe P, and acquires measurement flow rate data indicating the measured flow rate (instantaneous flow rate). The flow rate measurement engine 80 includes a processor 48 and a processor 64, and the processor 48 and/or the processor 64 configures various kinds of engines including the flow rate measurement engine 80.

The flow rate measurement engine 80 corrects the measured flow rate data acquired on the basis of information such as a pipe condition, such as an inside diameter of the pipe P, an environment temperature, and a pressure inside the pipe P, and supplies the measured flow rate data after correction as instantaneous flow rate data to an instantaneous flow rate buffer 82. The instantaneous flow rate data that is temporarily held in the instantaneous flow rate buffer 82 is updated, for example, for every 30 milliseconds. This update cycle time may be arbitrarily settable.

The flow meter Fm outputs, on the basis of instantaneous flow rate data held in the instantaneous flow rate buffer 82, through an interface (FIG. 4), an analog signal indicating the instantaneous flow rate to the outside. Moreover, the flow meter Fm outputs, on the basis of a comparison result of the instantaneous flow rate data held in the instantaneous flow rate buffer 82 with a threshold set in advance, through the interface, an ON/OFF signal indicating the comparison result to the outside.

A total integrated flow amount buffer 84 temporarily holds a total integrated flow amount that is used for calculating an integrated flow amount (use amount) that is sectioned by time unit. The total integrated flow amount is one type of an integrated flow amount (use amount), and is an integrated flow amount (use amount) that is not reset by trigger input, which is unrelated to the time unit. In other words, the engine including the processor 64 executes, without resetting the total integrated flow amount of the total integrated flow amount buffer 84, integrated processing based on the instantaneous flow rate data held in the instantaneous flow rate buffer 82, and updates the total integrated flow amount buffer 88 for every one millisecond, for example. This update cycle time is preferable to be arbitrarily settable.

The total integrated flow amount of the total integrated flow amount buffer 84 is stored in the logging memory 74. The total integrated flow amount is stored in a region of the logging memory 74 that is sectioned by time unit of one hour and in a state of being associated with the time from the RTC 68.

As for a leak of the compression air, the leak amount varies by receiving influences of an operation status of an in-house device, a pipe internal pressure, an environment temperature, and the like. As for the leak amount, for example, the flow rate measured in the middle of the night or on a holiday when the in-house devices are stopped is specified, parameters such as an internal pressure of the pipe and the environment temperature are added thereto, and the current leak amount is determined. As for this leak amount, a leak amount and an integrated value thereof are obtained in the engine including the processor 64 from the instantaneous flow rate buffer 82, and this integrated value is temporarily held in a total leak integrated amount buffer 86, and thereafter is stored in the logging memory 74. The total leak integrated amount is stored in a region of the logging memory 74 that is sectioned by time unit of one hour and in a state of being associated with the time from the RTC 68.

In the logging memory 74, when a storage format is sectioned by time, in other words, is defined by the time unit of one hour in advance, a log is added for every one hour. A display processing engine 88 generates, on the basis of the total integrated flow amount and the total leak integrated amount stored in the logging memory 74, a displayed image of a use amount for every day-and-time section, a leak integrated amount for every day-and-time section, or the like. The displayed image generated by the display processing engine 88 is displayed on the display device 38. In the display device 38, for example, the display is updated for every 200 milliseconds. This display update cycle time is preferable to be arbitrarily settable.

Figure 6:
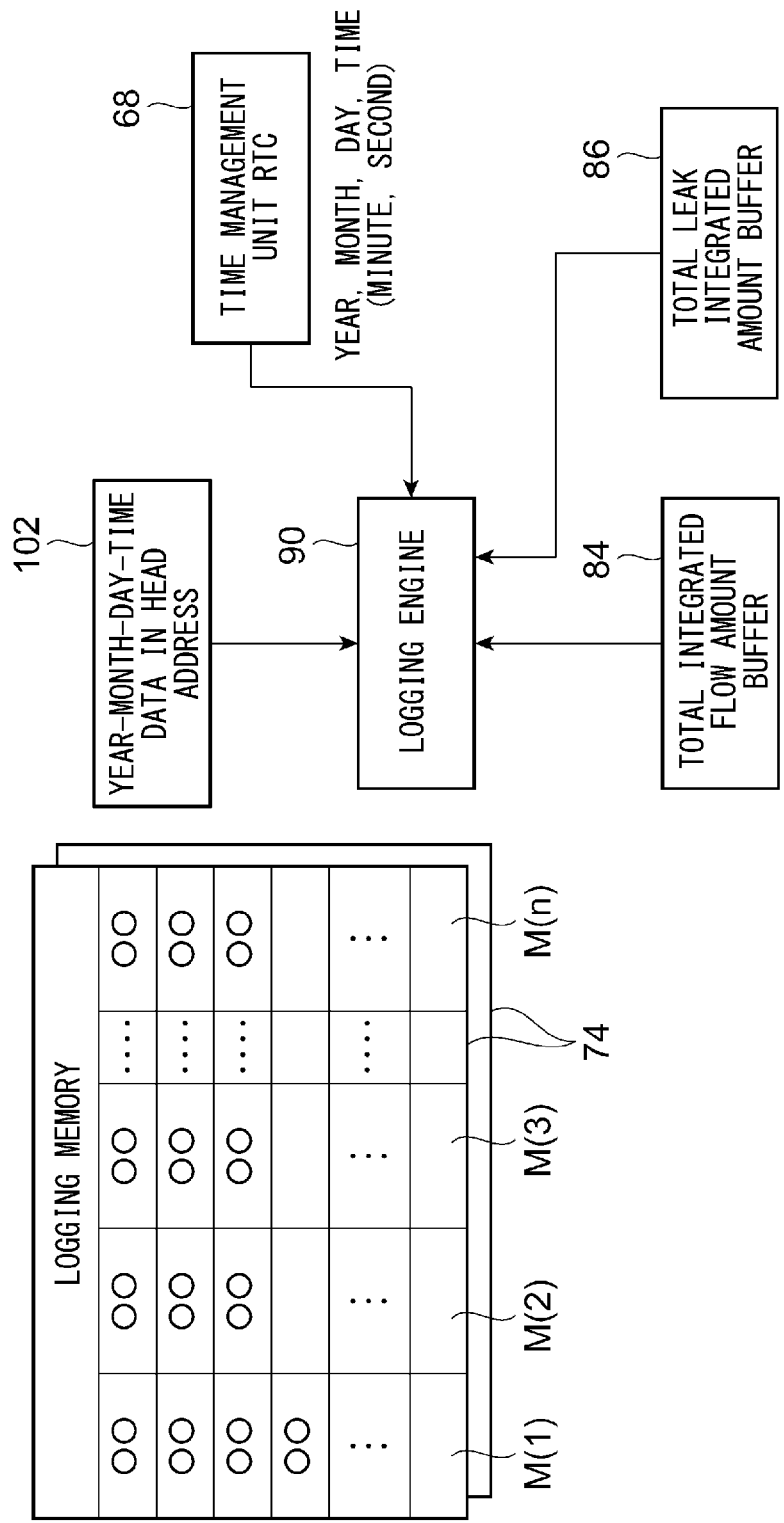
FIG. 6 is a diagram for explaining collecting display data in a memory.

The collection of display data in the logging memory 74 will be described with reference to FIG. 6, time (time information) of the real-time is input into the logging memory 74 from the RTC 68. The logging memory 74 includes, for example, memory regions M(1), M(2), . . . , M(n), which are sectioned for every one hour and are temporally continued, and the total integrated flow amount and the total leak integrated amount are successively stored in each memory region M(n). In a state where a memory head address and time information (year-month-day-time information) of the RTC 68 are associated with each other, the total integrated flow amount and the total leak integrated amount are stored in the corresponding each memory region M(n). Further, in each memory region M(n), an address offset amount and a time offset amount are associated with each other from the head address. Accordingly, a memory address is uniquely determined with respect to a desired time, and there is thus an advantage that a time search is unnecessary. In other words, target data is not searched in the data stored in the logging memory 74, but data during the target period can be extracted from a correspondence relation between year, month, day, and time in the time information and the address. In other words, the logging memory 74 manages the real-time year-month-day-time, in other words, time information, by the RTC 68, this time information, in other words, the real-time year-month-day-time and the stored data are corresponded to each other in one-to-one. Therefore, the logging memory 74 can extract data during the target period from a correspondence relation between the time information and the address, and thus easily generates information indicating a display range set by the user, in other words, a history in the time width, in other words, an integrated flow amount or the like.

As mentioned in the above, the display unit 4 includes the real-time clock (RTC) 68 that functions as a real-time clock. Power supply can be supplied all the time through the first cable 30 connected to the display unit 4. Accordingly, it is possible to cause the logging memory 74 to continually store therein data in association with the time information of the RTC 68. Note that, the data that is stored in the logging memory 74 may be able to be copied to a nonvolatile recording medium, for example, an SD card.

Note that, in the total integrated flow amount buffer 84 and the total leak integrated amount buffer 86, when the number of digits of the buffer is exceeded, overflow processing in which integration is made from 0 (zero) is executed. Moreover, an integrated flow amount for each section region M(n) can be obtained from a difference in total integrated flow amount at each time, as will be described later, and the difference becomes minus when the overflow occurs. When the difference is minus, a total difference integrated amount is calculated by regarding that the overflow occurs. When an overflow occurs in each section region M(n), an accurate integrated flow amount cannot be calculated. Accordingly, the buffer size (number of digits) is preferably set, even when the integration is successively executed using the maximum flow amount and each section region M(n) is set large, such that an overflow occurs one time or less in the section region M(n). For example, when each section region M(n) is set in a unit of one month, setting the size of the buffer (number of digits) to the extent that an overflow occurs one time or does not occur in a unit of year can prevent an overflow from occurring twice or more in one month.

Figure 7:
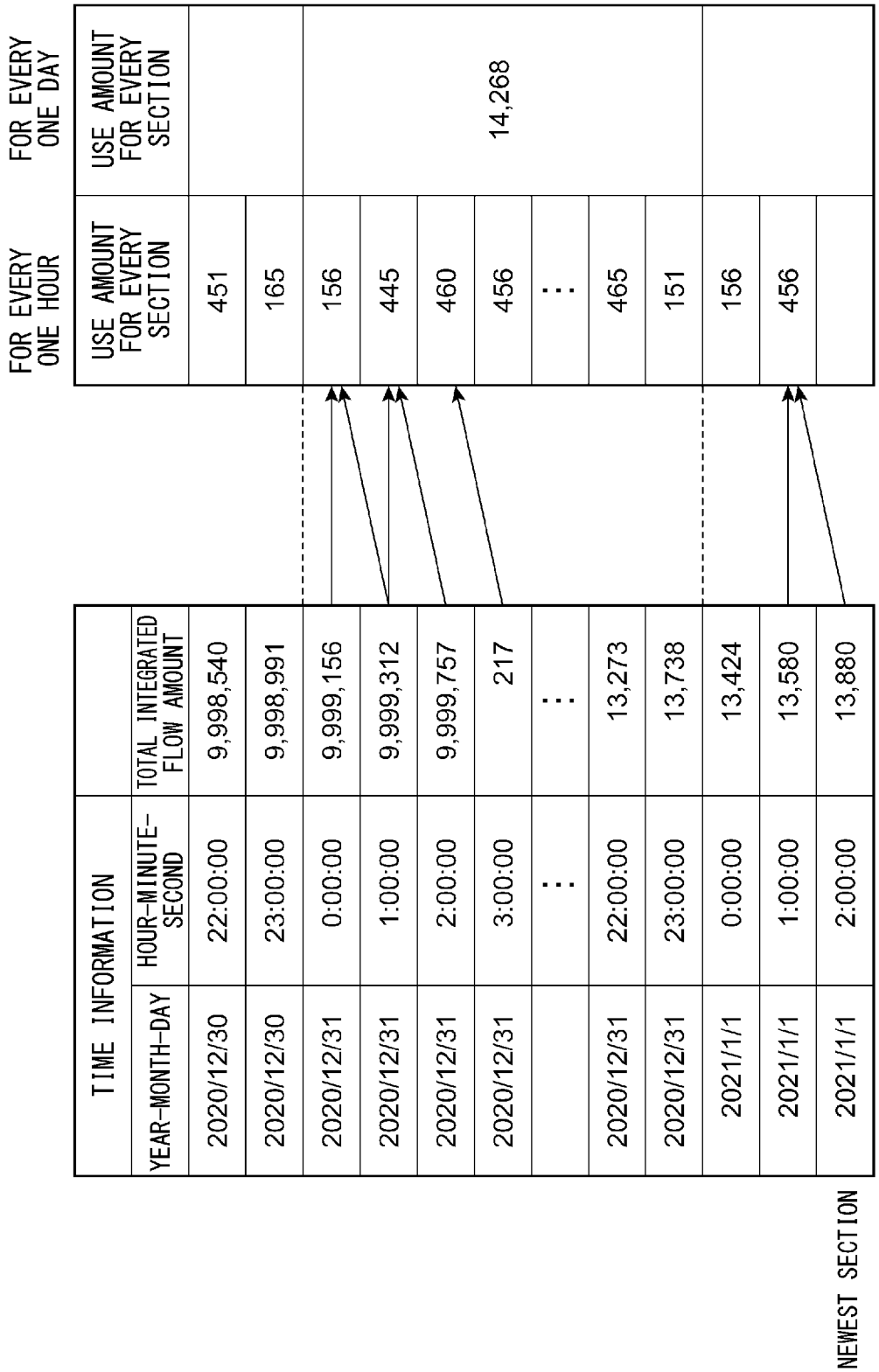
FIG. 7 is a diagram for exemplarily explaining difference calculation and overflow processing.

As for the difference calculation and the overflow processing, with reference to FIG. 7, when an example in which the total integrated flow amount is logged for every hour is exemplified and specifically explained, for example, the use amount during 1:00-1:59 (1:00:00 to 1:59:99) on Dec. 31, 2020 is calculated as 445 by obtaining a difference of the total integrated flow amount 9,999,312 during 1:00-1:59 on Dec. 31, 2020 from the total integrated flow amount 9,999,757 during 2:00-2:59 (2:00:00 to 2:59:99) on Dec. 31, 2020. Moreover, an overflow of the total integrated flow amount (overflow in 10,000,000) occurs during 2:00-2:59 on Dec. 31, 2020, the total integrated flow amount is decreased during 3:00-3:59, but by the overflow processing, 10,000,000 is added to the total integrated flow amount during 3:00-3:59 to obtain a difference, whereby the use amount during 2:00-2:59 on Dec. 31, 2020 is calculated as 460. Moreover, the use amount on Dec. 31, 2020 is calculated as 14,268, by obtaining a difference of the total integrated flow amount 9,999,156 during 0:00-0:59 on Dec. 31, 2020 from the total integrated flow amount 13,424 (overflow processing, 10,013,424) during 0:00-0:59 on Jan. 1, 2021.

Figure 8:
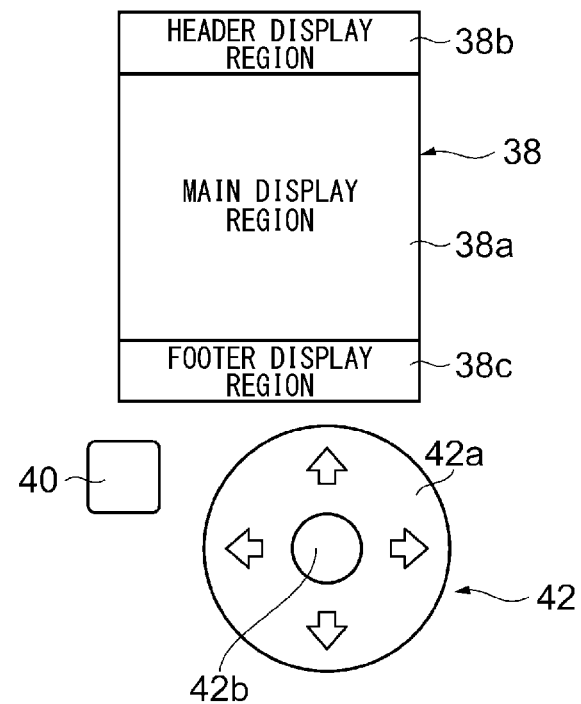
FIG. 8 is a diagram for explaining an overview of the display using a color liquid crystal that is a display device of the display unit.

With reference to FIG. 8, an overview of the display using the color liquid crystal 38 that is a display device of the display unit 4 will be described. The color liquid crystal 38 has a rectangular shape, and in a screen of the color liquid crystal 38, set are a main display region 38a in the central portion in the up-and-down direction, a header display region 38b on the upper side from the main display region 38a, and a footer display region 38c on the lower side from the main display region 38a.

Figure 9:
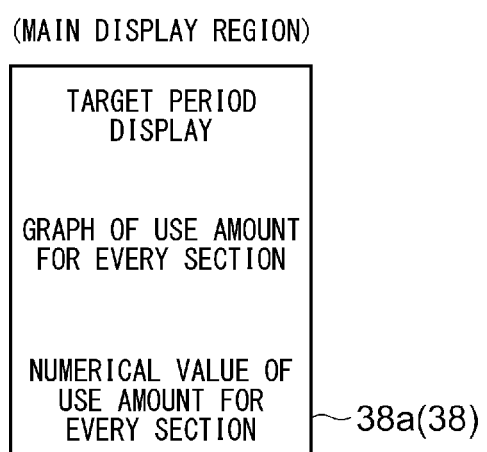
FIG. 9 is a diagram for explaining an example of items that are displayed in a main display region of the color liquid crystal.

FIG. 9 is a diagram for explaining an example of items that are displayed in the main display region 38a. In the main display region 38a, in addition to an instantaneous flow rate (current value) in which a numerical value of the display instantaneous flow rate is displayed, a display range set by a user, in other words, a history display of a time width, a graph display of the gas use amount for every section, and a history numerical value display of the gas use amount for every section, can be displayed. These display items may be simultaneously displayed, or may be selectively displayed on the basis of an operation by the user. The current value and the history are simultaneously displayed to enable the user to grasp a past history while grasping a current state. When the user changes the display range, in other words, the setting of the time width, the history display is immediately changed in response to this change.

Figure 10:
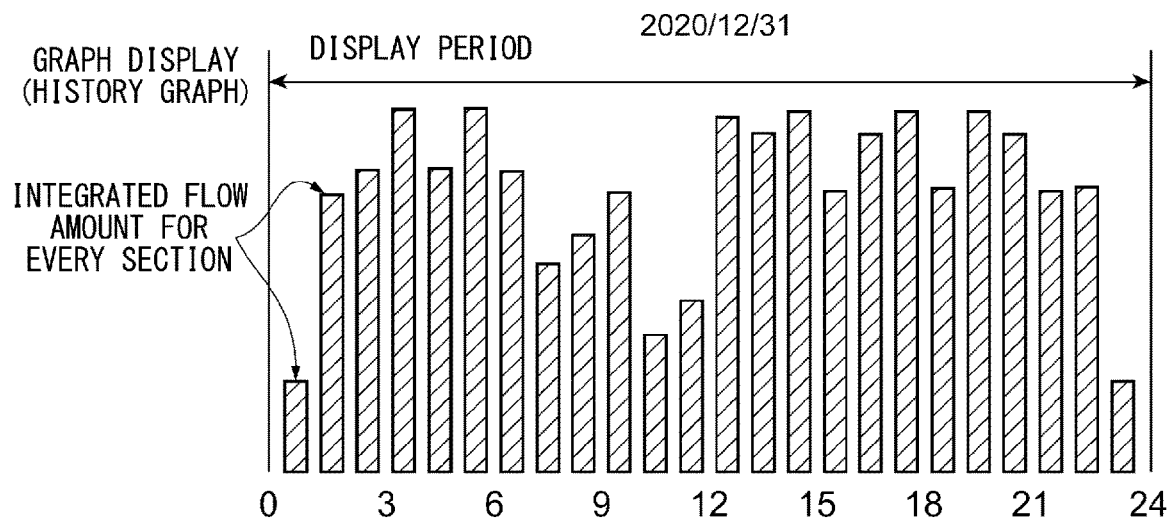
FIG. 10 is a diagram for explaining a graph display of a history.
Figure 11:
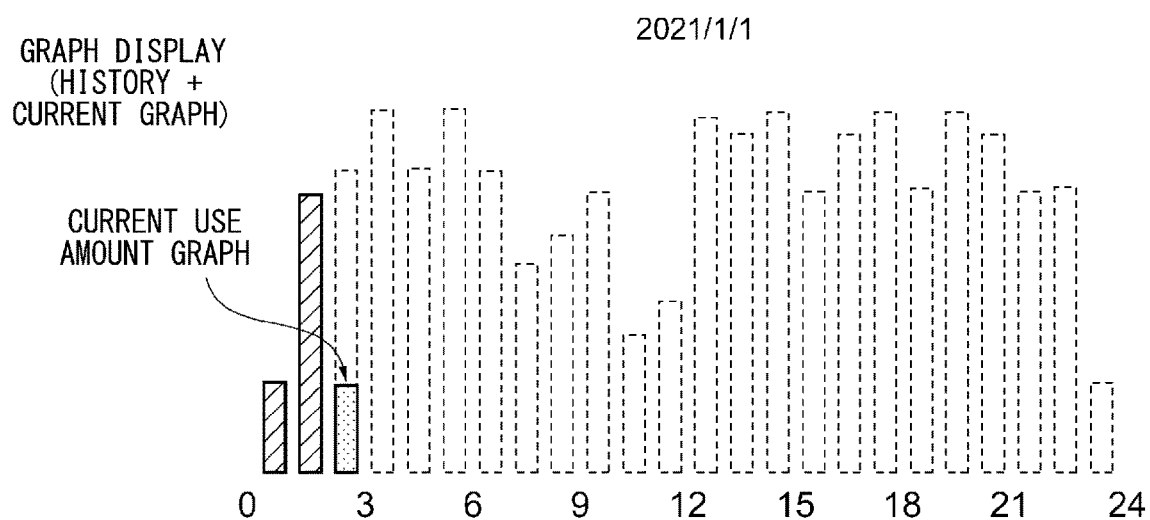
FIG. 11 is a diagram for explaining a graph display in each time section in a case of a display range including the current time.

FIG. 10 is a diagram for explaining a graph display of a history, and illustrates a bar graph that corresponds to the integrated flow amount (use amount) corresponding to each time section (in the illustrated example, one hour) in the display range, on the basis of the total integrated flow amount in association with the time stored in the logging memory 74. FIG. 11 is a diagram for explaining a graph display in each time section in a case of a display range including the current time. A bar graph that is displayed with the current time sectioned by the time is displayed on the basis of the latest total integrated flow amount in the total integrated flow amount held in the total integrated flow amount buffer 84 and the total integrated flow amount in association with the time stored in the logging memory 74, and is extended from time to time and from moment to moment in accordance with an update of the total integrated flow amount held in the total integrated flow amount buffer 84. In other words, not only a bar graph corresponding to the current time section from 2:00 to 3:00, a bar graph corresponding to the past time section from 0:00 to 2:00 can be displayed using the total integrated flow amount in association with the time stored in the logging memory 74. The graph is displayed using the time section with high periodicity and high regularity, so that a comparison with the past state becomes easy. Accordingly, even if an accurate value of the use amount in a normal state has not been grasped, a quantitative comparison with the past state becomes easy, and thus the management of gas such as the compression air becomes easy, for example.

In the display in the display range including the current time, a bar graph of the history for every corresponding time section in the past period range may be superimposed and displayed at a position of the corresponding time section. In this superimposed display, for easy identification from the bar graph of the history, for example, a different-color or translucent display mode may be preferably employed. When the user changes the display range, in other words, changes the setting of the time width, on the basis of the total integrated flow amount in association with the time stored in the logging memory 74, the graph display can be immediately changed to the graph display corresponding to this change.

In the display related to the history display, a date corresponding to the display period is displayed. When day is selected, year, month, and day are displayed, and when month is selected, year and month are displayed, and when year is selected, year is displayed. With reference to FIG. 8, the display item in the target period can be selected with the menu button 40, and an up-down-left-right button 42*a* of the operation unit 42, and the selected change can be confirmed with a SET button 42*b*.

As a section corresponding to the display range (time width) in the graph display, when day is selected as the display range, a total integrated amount in every section for every one hour (0:00-0:59 to 24:00-24:59) on the day is preferably bar-graphically displayed as a history graph display. In place of the bar graph, a line graph may be displayed. Moreover, the bar graph and the line graph may be selectable. When month is selected as the display range, the total integrated amount is displayed as a bar graph in sections in the month, in other words, every day from the 1st to 31st. In place of the bar graph, a line graph may be displayed. When year is selected as the display range, the total integrated amount is preferably displayed as a line graph in sections in the year, in other words, every month from January to December. In place of the line graph, a bar graph may be displayed.

As for the graph display, a display range, such as the week, the half-year period, in the morning, and in the afternoon, the limited time width (for example, three hours) may be selectable. When week is selected as the display range (time width), a bar graph is displayed as a history graph of a total integrated amount in days of the week as sections in the week. In place of the bar graph, a line graph may be displayed. When a half-year period is selected as the display range (time width), the total integrated amount in respective weeks, in other words, 1st to 26th weeks, as sections in the half-year period is displayed as a bar graph. In place of the bar graph, a line graph may be displayed. When the display range of the morning or the afternoon is selected, a total integrated amount for every 30 minutes, as a section, for example, is displayed as a bar graph. In place of the bar graph, a line graph may be displayed. For example, when the display range (time width) of three hours is selected, a total integrated amount for every 10 minutes, as a section, for example, is displayed as a bar graph. In place of the bar graph, a line graph may be displayed.

Whether a bar graph is displayed or a line graph is displayed may be selectable. Moreover, whether a graph display is used or a numerical value display is used may be also selectable. Moreover, the graph display and the numerical value display may be displayed in a switchable manner.

A first display range including a day-and-time section including the current time and one or a plurality of past day-and-time sections continuous thereto, and a second display range including a plurality of continuous day-and-time sections past from the first display range, are switchable during the flow rate measurement being operated. After the operation of this switching, integrated flow amount data corresponding to each day-and-time section is immediately graphically displayed. After the display of this second display range, when a period with no operation by the user is continued for a certain period, the display may be automatically switched to the display of the first display range.

Figure 12:
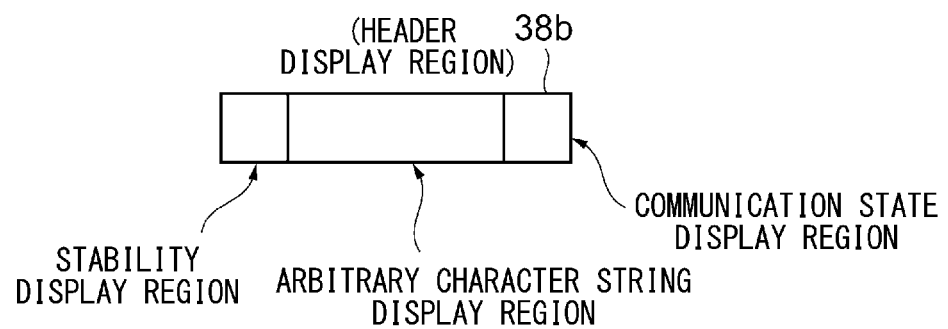
FIG. 12 is a diagram for explaining a header display region that is displayed in an upper portion of the color liquid crystal.

With reference to FIG. 12, the header display region 38*b* is used for displaying information that is convenient to be displayed over a plurality of screens, for example, the stability of the flow rate measurement is graphically displayed or bar-displayed, displaying an arbitrary character string, for example, the character string set by the user, and displaying the communication state.

Figure 13:
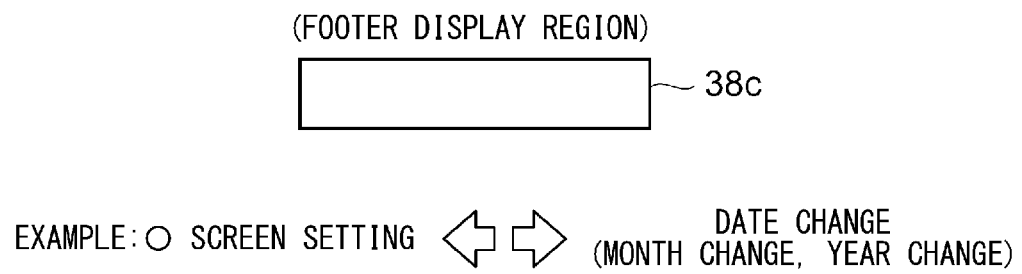
FIG. 13 is a diagram for explaining a footer display region that is displayed in a lower portion of the color liquid crystal.

The footer display region 38*c* is used for displaying an operation guide, for example. A specific example is illustrated in FIG. 13. For example, a circular icon indicating the SET button 42*b* is displayed for screen setting, and a pair of triangular icons indicating the left and right operation of the up-down-left-right button 42*a* and directing left and right is displayed for the operation of the date change, the month change, or the year change.

Figure 14:
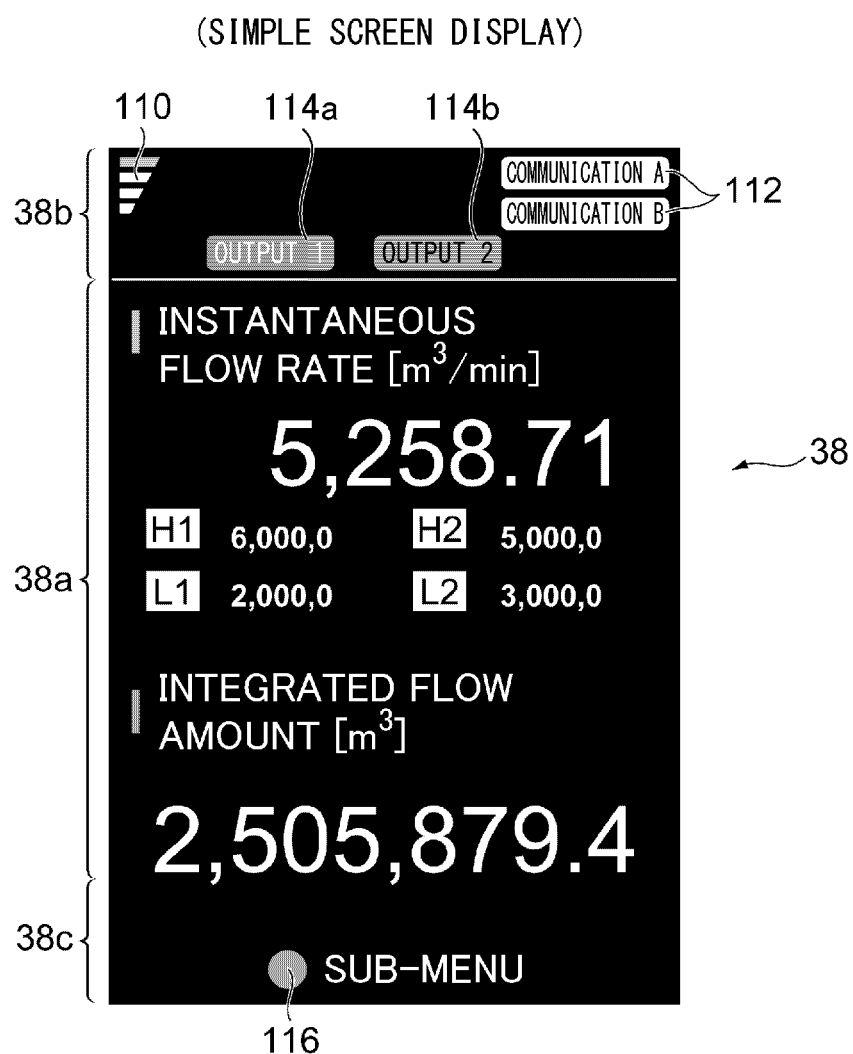
FIG. 14 is a view illustrating a display screen that displays an instantaneous flow rate.

FIG. 14 to FIG. 18 illustrate concrete examples related to the display. FIG. 14 illustrates a display screen displaying an instantaneous flow rate (current value). When this display screen is called "simple screen", in the simple screen display, a numerical value display of the instantaneous flow rate (current flow rate value), for example, "5,258.71" is displayed in the main display region 38*a* of the color liquid crystal 38. Moreover, in the main display region 38*a*, numerical values of thresholds H1 and L1 for first output and thresholds H2 and L2 for second output are displayed. Although two thresholds H and L for each output are provided in this display example, one threshold may be provided.

As the illustrated display example, in a case of two thresholds H and L, when the instantaneous flow rate (current value) is between H and L, ON is may be set, or conversely, when the instantaneous flow rate (current flow rate value) is between H and L, OFF may be set. In a case of one threshold, when the instantaneous flow rate (current flow rate value) exceeds a threshold, ON may be set, and conversely, when the instantaneous flow rate (current flow rate value) exceeds a threshold, OFF may be set. It is preferable to be capable of setting a threshold for every output, in other words, two thresholds or one threshold, selecting a state for ON, and setting a threshold. These selection and setting can be made by operating the menu button 40 and the operation button 42 during the flow rate measurement being operated.

Herein, in addition to the volume flow amount (real flow amount) in a measurement state, whether a conversion flow amount such as a volume flow amount (normal flow amount) in a normal state or a standard flow amount at the reference temperature of 20° C. is displayed may be selectable, and these selections can be made by the menu button 40 and the operation button 42 being operated.

In the main display region 38*a*, the numerical value of an integrated flow amount may be displayed. Whether this integrated flow amount is displayed may be selectable. Herein, the integrated flow amount is an integrated flow amount from the time point when a reset signal is input by the trigger input from the outside and the button input. In place of the integrated flow amount, whether the use amount or the leak amount is displayed may be selectable. These selections can be made by the menu button 40 and the operation button 42 being operated.

In the header display region 38b, a graph display 110 that imitates a measurement stability display lamp is displayed. In place of the graph display 110, a bar display may be used. The graph display 110 displays whether the flow rate has been measured with stability.

In the header display region 38b, communication information 112 on each of "communication A" and "communication B" is further displayed. The communication A means USB communication meaning, for example, and the communication B means IO-LINK communication, for example.

In the header display region 38b, an ON/OFF output display lamp 114 is further displayed. In the illustrated example, the ON/OFF output display lamp 114 includes a display lamp 114a for the first output and a display lamp 114b for the second output, and the display lamp 114a for the first output is in an ON state and the display lamp 114b for the second output is in an OFF state.

To set a threshold for each output, a menu button 42 is operated in accordance with an icon 116 that is displayed in the footer display region 38c to call a sub-menu, and a threshold for each output can be set in this sub-menu.

Figure 15:
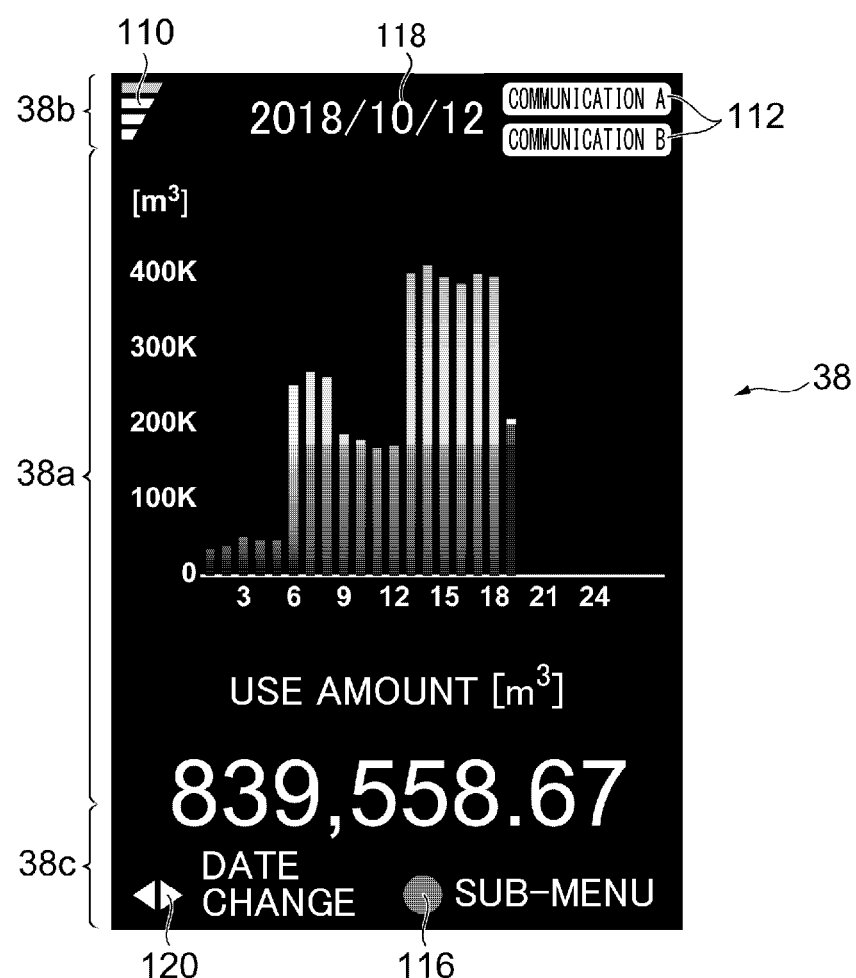
FIG. 15 is a view illustrating a display screen that simultaneously displays a graph and a numerical value of the use amount.

In the explanations of display screens in FIG. 15 and thereafter, the reference numerals are assigned in the common display, and explanations thereof are omitted. FIG. 15 illustrates a screen on which a bar graph of the use amount and a numerical value are simultaneously displayed. In the header display region 38b, a display range (period range) 118 of the use amount is displayed as year, month, and day. The screen illustrated in FIG. 15 illustrates a case of the unit of "day". Herein, "2018" means year, "10" means October, and "12" means twelfth day. In a case where the display uses the unit of "month", "2018/10" is displayed, and in a case of the unit of "year", "2018" is displayed. For example, in a case of a "week" unit, "2018/35-36 weeks" may be displayed. To set this display range (period range), in other words, to set the time width, the menu button 40 is operated in accordance with the icon 116 of a sub-menu displayed in the footer display region 38c to select the sub-menu, and the display range can be set from the displayed sub-menu. This setting change can be made during the flow rate measurement being operated, and the setting change of the display range is immediately reflected to the graph display the integrated flow amount. In the sub-menu, for example, selection choices of "day", "month", and "year" are displayed, and the user may be caused to select one among the three selection choices. Moreover, in the sub-menu, the user may be caused to select one display language among multiple selection choices.

FIG. 15 displays the case where the display range is the unit of "day" and the section is the unit of "time", as mentioned as the above. Therefore, each graph in the bar graph is displayed in the unit of time. The scale width of the bar graph is auto-scaled in accordance with the maximum use amount, in the use amount in each section in the display range.

In a case where the display range is the unit of "month", the section is the unit of "day", and in a case where the display range is the unit of "year", the section is the unit of "month". In a case of the unit of "week", the section is the unit of "day". These display ranges, in other words, the time widths are changeable during the flow rate measurement being operated.

On the display screen illustrated in FIG. 15, the integrated use amount (integrated flow amount from 0:00 to the current time) in the display region is numerically displayed. In other words, the total amount of the respective use amounts displayed as a bar graph is numerically displayed. When the display range is the unit of "month", the total of the use amount on the month is numerically displayed. When the display range is the unit of "year", the total use amount in the year is numerically displayed. In a case where the display range includes the current time, the numerical value of the use amount is increased from moment to moment in accordance with the (instantaneous) flow rate.

The use amount displayed in the main display region 38a means the integrated value (integrated flow amount) of the flow amount in each section. The "integrated flow amount" having been explained with reference to FIG. 14 is an integrated value from when a reset signal is input. FIG. 15 illustrates a state during 18:00-18:59, in which the bar graph during 18:00-18:59 is extended from moment to moment in accordance with the instantaneous flow rate (current use amount). On the other hand, a bar graph (from 0:00 to 18:00) from 0:00-0:59 to 17:00-17:59 illustrates a past state (history of the use amount). Preferably, the history value and the current value (use amount during 18:00-18:59) may be classified by color and displayed.

In the footer display region 38c, an icon 120 for date change is displayed. The icon 120 includes a pair of triangles directing left and right, and the left-right button in the up-down-left-right button 42a of the operation button 42 indicated by the icon 120 having the pair of triangles is operated to allow the date in the display range (period range) to be changed. For example, when the date is changed to the previous day "2018/10/11", in all the period from 0:00-0:59 to 23:00-23:59 (from 0:00 to 24:00), the past state (history of the use amount) is displayed.

In the main display region 38a, in addition to the display of use amount, the simultaneous display of use amount+leak amount, the display of leak amount, or the like can be selected. The selection of the display content can be performed by selecting a sub-menu, and selecting a display item in the sub-menu.

Figure 16:
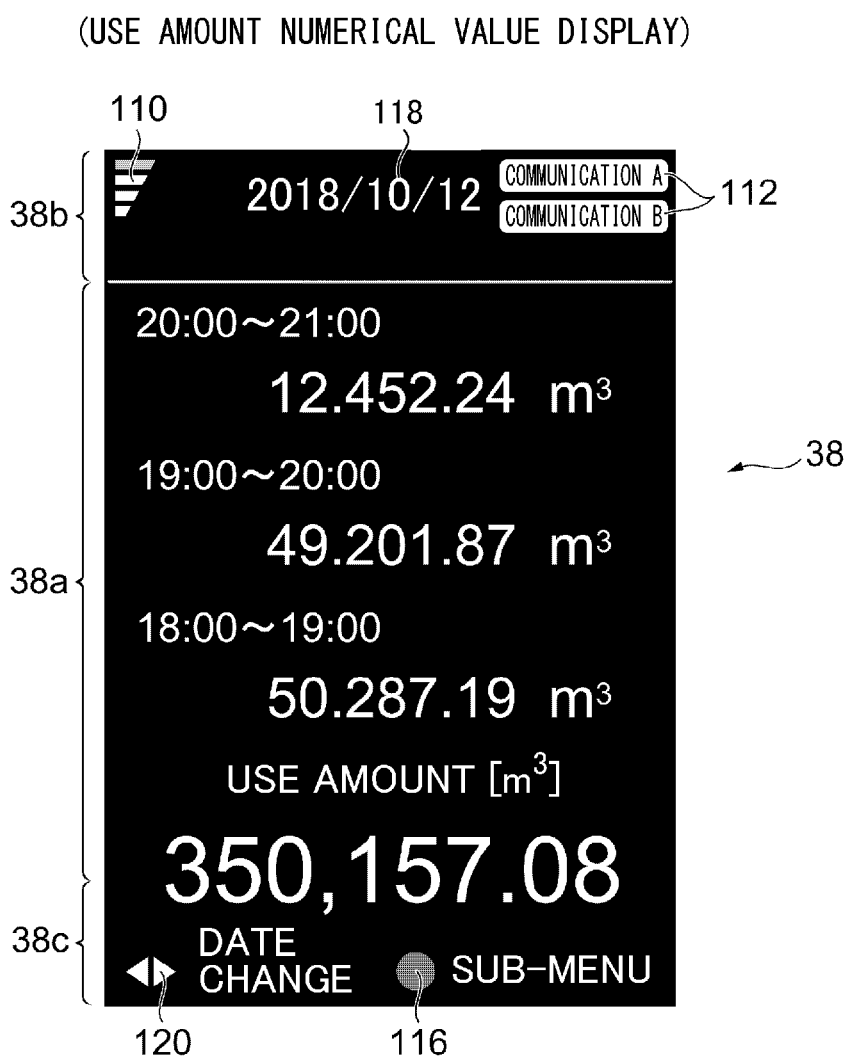
FIG. 16 is a view illustrating a display screen that displays the use amount.

The display screen illustrated in FIG. 16 numerically displays thereon the use amount. In the main display region 38a, the section use amount and the integrated use amount in the display range (flow amount integrated from 0:00 to the current time) are numerically displayed.

Figure 17:
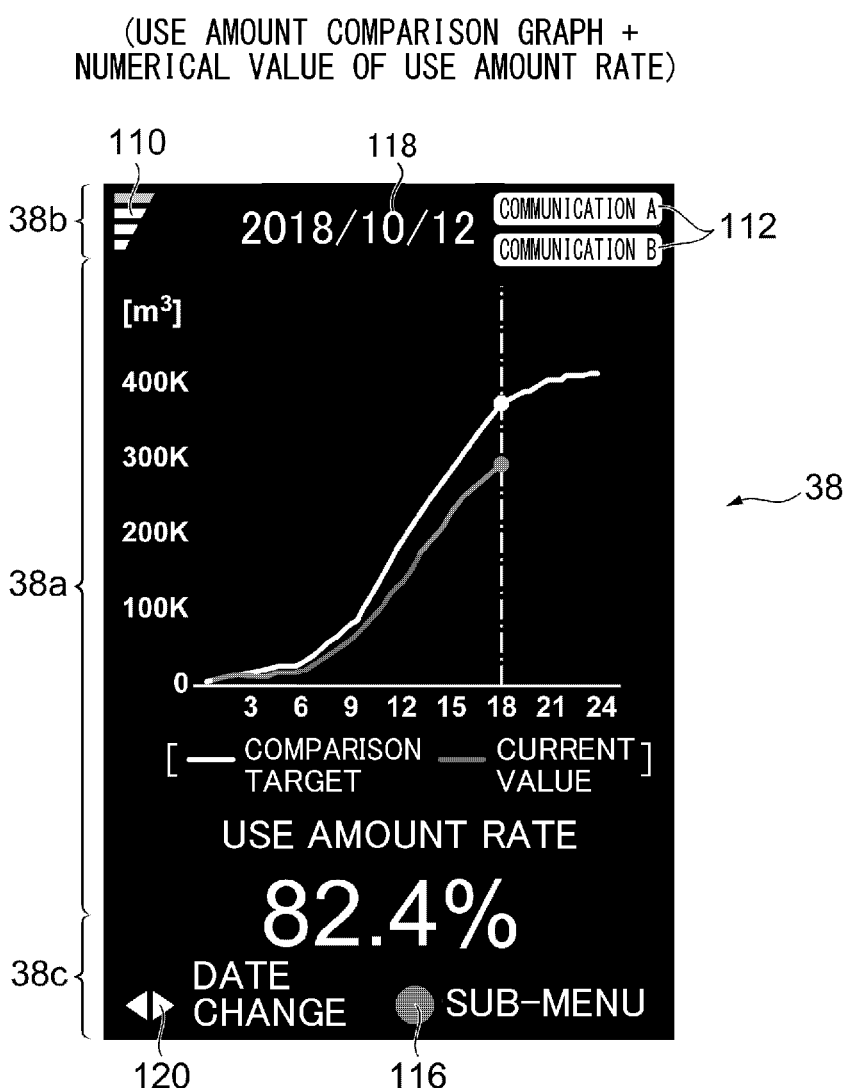
FIG. 17 is a view illustrating a display screen that simultaneously displays a use amount comparison graph and a comparison rate.

The display screen illustrated in FIG. 17 simultaneously displays a use amount comparison graph in which the use amount in a first display range and the use amount in a second display range are superimposed and displayed, and a numerical value of the use amount rate. The use amount comparison graph is displayed as a line graph, and is not necessarily displayed, because the day, the month, and the year in a case of a display range including the current time, in a display range of the line graph as a comparison target, are exactly the same as those at the current time. The display range can be set by selecting a sub-menu, and performing setting in the sub-menu.

In this setting change, when a user operates the operation unit 42 during the flow rate measurement being operated, the operation by the user is accepted, and the setting change of display range is made. Further, the graph display is changed corresponding to this setting change of display range. Further, thereafter, when a period with no operation by the user is continued for a certain period, the setting of the display range may be automatically switched to the original display range.

In addition, after the setting has been switched from the first display range to the second display range, when the setting is switched to the third display range with the operation by the user, a use amount graph corresponding to the first display range and a use amount graph corresponding to the third display range are displayed by comparison at display positions in the display range being aligned.

In the use amount comparison graph, a line graph of the history use amount in the past specified display range and a line graph of the use amount in the display range including the current time are superimposed and displayed. In other words, the two types of line graphs are displayed by being aligned with the common axis (unit: $m^3$). A line graph serving as a comparison target may be displayed as a ghost. The use amount comparison graph indicates the use amount (flow amount integrated from 0:00 to the relevant time) from the start of the display range to the relevant time, and corresponds to the section use amounts being integrated. Preferably, a vertical dashed line indicating the current position may be displayed. Moreover, a circular mark may be displayed at a point orthogonal to the vertical dashed line (18:00-18:59) indicating the current position on each line graph.

As a modification example, the same sections (the same relative section in different display ranges: for example 18:00-18:59) in different display ranges may be displayed by comparison. Moreover, the date serving as a comparison target can be changed by operating the operation button 42. In this case, the same sections in the display range including the current time and the comparison target after the change are displayed by comparison.

As a use amount rate, the rate in the same sections (the same relative section: for example 18:00-18:59) in different display ranges can be displayed. The current use amount (flow amount integrated from 0:00 to the current time) is displayed as the percentage when the use amount in the same section of the comparison target as 100. As a modification example, the current use amount may be displayed as the percentage when the total use amount (the use amount at 24:00) in the display range of the comparison target is 100.

In the display screen of FIG. 17 in which the display related to the use amount is made, the display can be switched to the display related to the leak amount with the operation by the user (sub-menu). In the display of the leak amount, a leak amount history comparison graph and a numerical value of the leak amount rate are simultaneously displayed.

Figure 18:
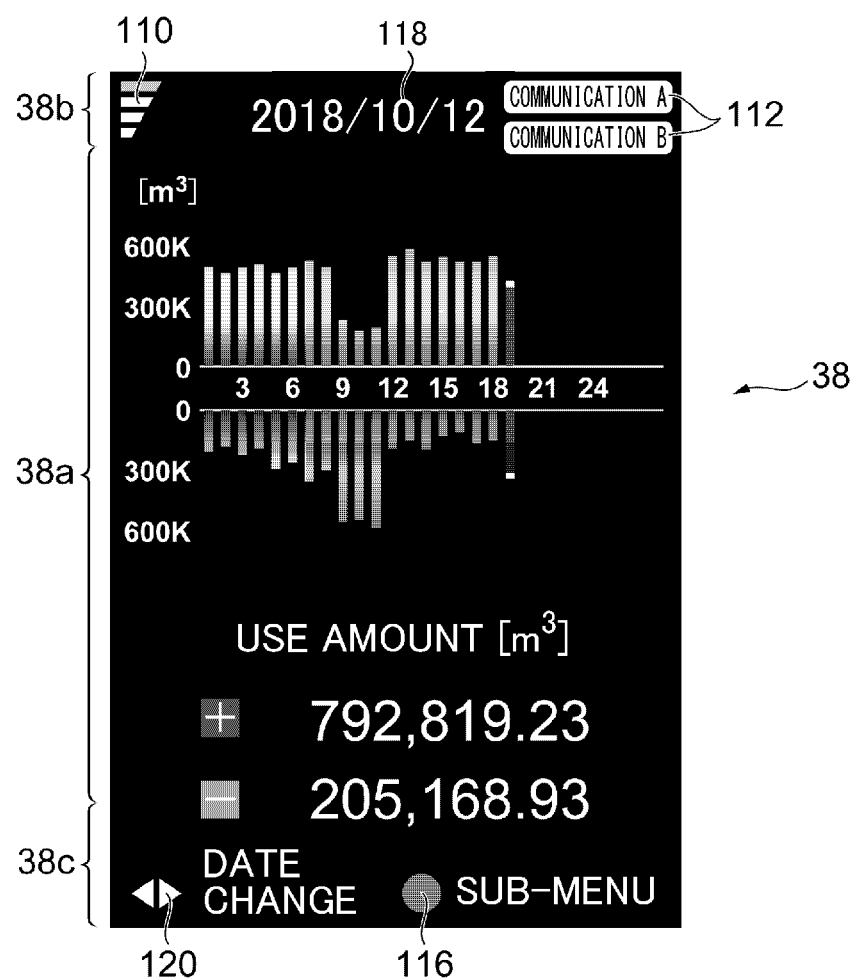
FIG. 18 is a view illustrating a display screen that displays the use amounts in a plus direction and a minus direction with bar graphs and numerical values.

In the display screen of FIG. 18, in a loop pipe, for example, bar graphs of the use amounts in the plus direction and in the minus direction and numerical values thereof are simultaneously displayed. Herein, when a first direction along the axis line Ax of the pipe P is defined as plus, and the reverse direction of the first direction is defined as minus, and the flow amount is integrated separately in the plus direction and in the minus direction, the bar graph of the use amount in the plus direction, the bar graph of the integrated use amount for every section of one hour in the illustrated example, means the flow amount in the plus direction, and the flow amount of the use amount in the minus direction is displayed as a bar graph of the use amount in minus direction. In the illustrated display example, the bar graph positioned above from the horizontal axis (time axis) indicates the integrated use amount in the plus direction for every hour, and the bar graph positioned below therefrom indicates the integrated use amount in the minus direction for every hour.

In the main display region 38a of the display screen in FIG. 18, "+" seen in the numerical value display of the displayed use amount indicates a total of use amounts, in other words, an integrated value of the use amount, in the plus direction display range, and "−" indicates a total of use amounts, in other words, an integrated value of the use amount, in the minus direction.

Individually displaying the use amounts in both direction of the plus direction and the minus direction is used, for example, for the management in a case of transferring the compression air between the factories, and a case where a direct flow (plus direction) and a back flow (minus direction) can be present such as loop piping. With reference to FIG. 14 to FIG. 18, the display device, in other words, the color liquid crystal 38, in the display unit 4 is used to enable not only the instantaneous flow rate but also various information to be supplied to the user. Accordingly, the user can directly use the information displayed on the color liquid crystal 38 and execute the rational and rapid factory management without processing the display data or the information.

Figure 19:
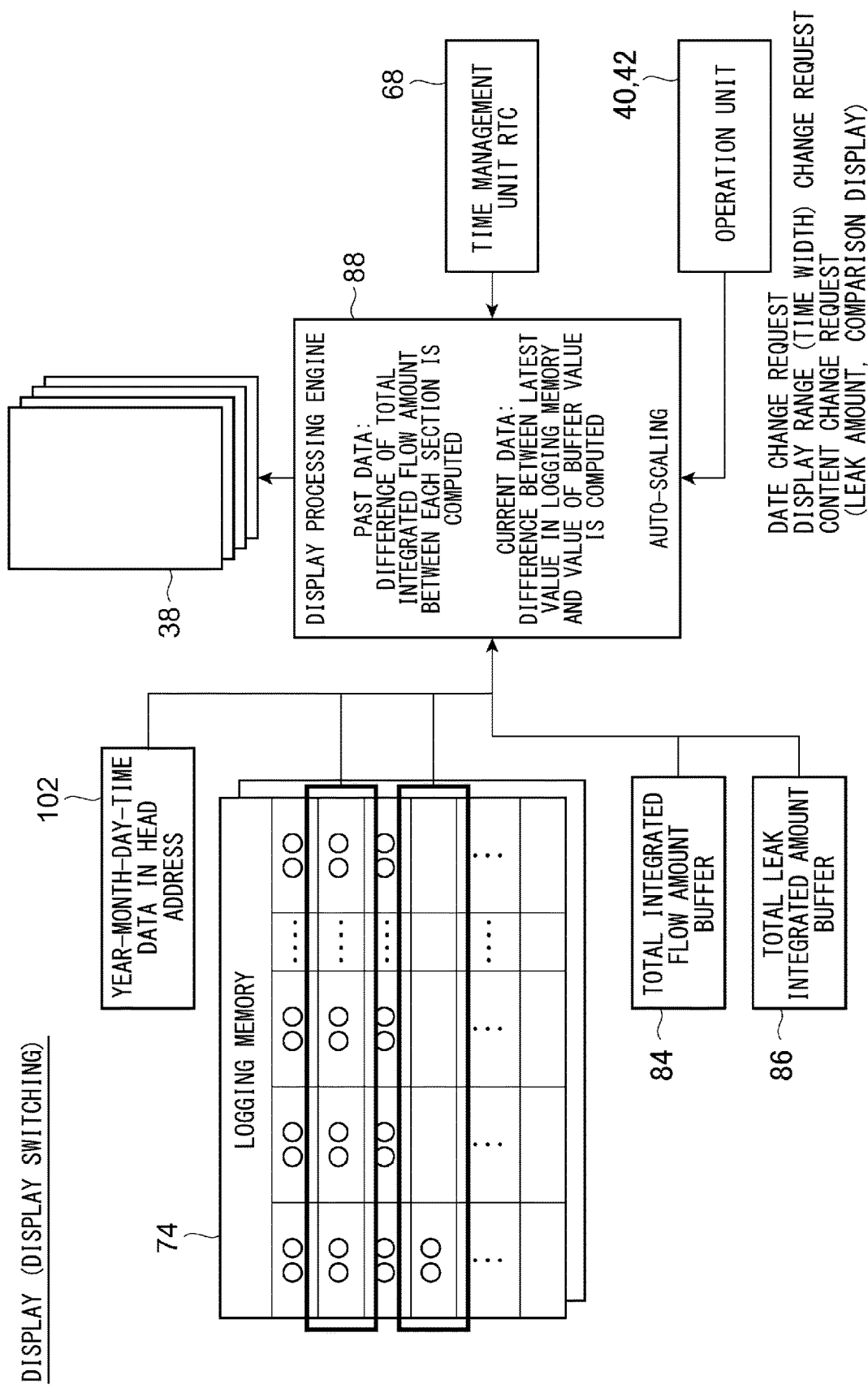
FIG. 19 is a diagram for explaining display switching.

The different display screens having been exemplarily explained with reference to from FIG. 14 to FIG. 18 can be switched by the selection of the user. This display switching will be described with reference to FIG. 19. In FIG. 19, the same elements having been explained with reference to FIG. 6 are assigned with the same reference numerals, and explanations thereof are omitted. The display processing engine 88 executes processing of switching the display screen of the color liquid crystal 38 when the user operates the operation units 40 and 42 (FIG. 8). The logging memory 74 stores therein data in each section in which the head address is in association with the time in the real-time. Therefore, when the display content is changed with the display switching, a difference of the total integrated flow amount between each section is computed as for past data, and a difference between the latest value in the logging memory 74 and the value of the total integrated flow amount buffer 84 (FIG. 5) is computed as for current data, thereby generating display data after the display screen switching, and display the display data.

Note that, with the operation of the operation units 40 and 42 in the display unit 4, without using the external PC, it is possible to easily request the date change, the change in the display range (time width), the change in the display content (leak amount, comparison display). Further, the user can cause necessary information to display on the color liquid crystal 38 of the display unit 4 with the setting by the simple operation of the operation units 40 and 42, and acquire information useful for the management of the use amount, for example.

Figure 20:
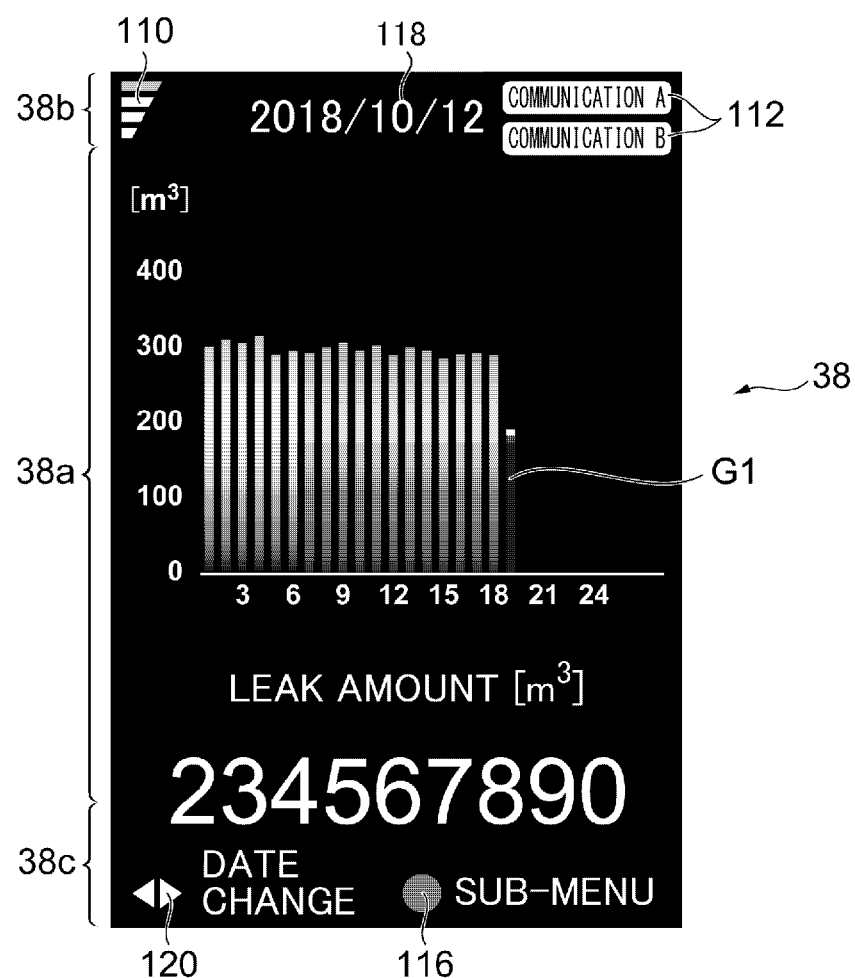
FIG. 20 is a view illustrating a display screen that displays a leak amount with a graph and a numerical value.
Figure 21:
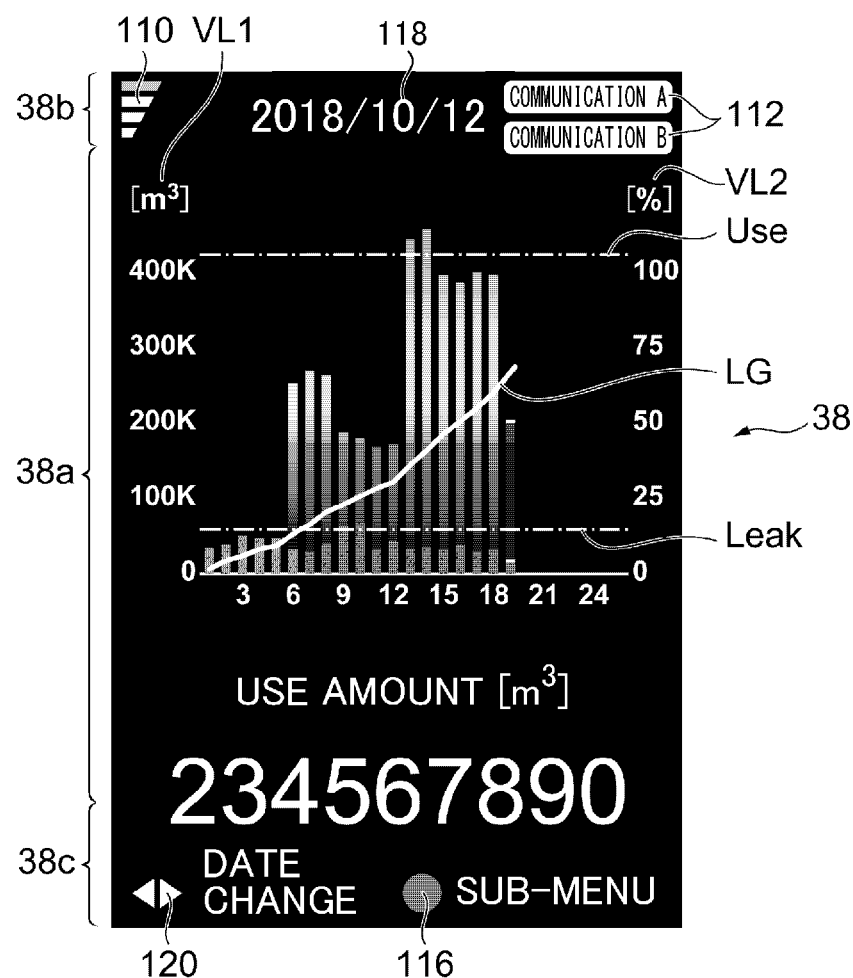
FIG. 21 is a view illustrating a display screen that simultaneously displays a use amount and a leak amount.
Figure 22:
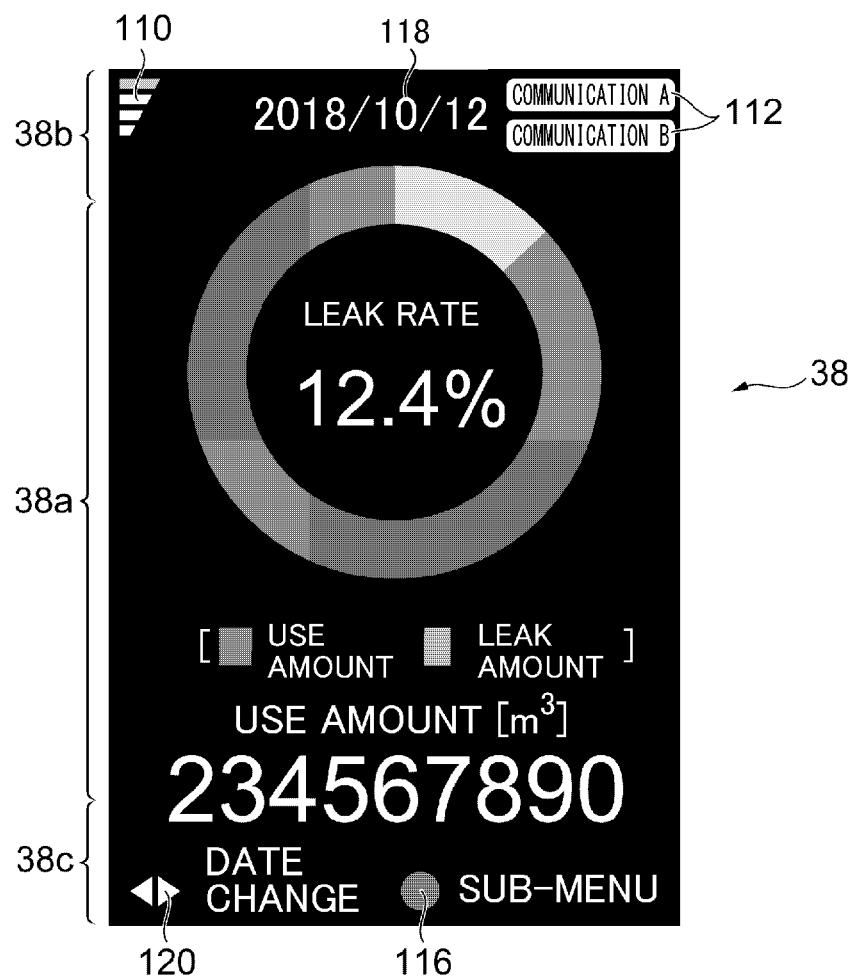
FIG. 22 is a view illustrating a display screen that displays a leak rate.

FIG. 20 to FIG. 22 each illustrate a display example of a display screen. In the display screen illustrated in FIG. 20, the leak amount is displayed. Specifically, a leak integrated amount for every day-and-time section (in the illustrated example, for every one hour) is displayed as a bar graph, and a total leak integrated amount in the display range is numerically displayed.

The display processing engine 88 (FIG. 5) generates a display screen in which a leak integrated amount to be determined on the basis of the total leak integrated amount held in the total leak integrated amount buffer 86 and the latest total leak integrated amount in the total leak integrated amount in association with the time stored in the logging memory 74, is graphically displayed at a position of the corresponding day-and-time section.

The total leak integrated amount held in the total leak integrated amount buffer 86 (FIG. 5) is updated from time to time and from moment to moment, and the display processing engine 88 generates a display screen in which a leak integrated amount is graphically displayed at a position of the corresponding day-and-time section, on the basis of the updated total leak integrated amount. The total leak integrated amount and the display screen are updated, so that a bar graph G1 (FIG. 20) of the leak integrated amount to be displayed in the current day-and-time section is extended from time to time and from moment to moment in accordance with the update.

Moreover, the display processing engine 88 generates a display screen in which a leak integrated amount in each day-and-time section to be determined on the basis of each total leak integrated amount in each day-and-time section corresponding to the display range, in the total leak integrated amount in association with the time stored in the logging memory 74, is bar-graphically displayed at a position of the corresponding day-and-time section of the display graph in FIG. 20, for example. As a result, each leak integrated amount corresponding to the past each day-and-time section and the leak integrated amount corresponding to the current day-and-time section are simultaneously displayed with high regularity.

The graph is displayed using the day-and-time section with high periodicity and high regularity, so that a comparison with the past state becomes easy. Accordingly, even if an accurate value of the leak integrated amount in a normal state has not been grasped, a quantitative comparison with the state of the past history becomes easy, and thus the management of gas such as the compression air becomes easy, for example.

In the footer display region 38c, the icon 120 for date change is displayed. The icon 120 includes a pair of triangles directing left and right, and the left-right button in the up-down-left-right button 42a of the operation button 42 indicated by the icon 120 having the pair of triangles is operated to allow the date in the display range (period range) to be changed. For example, when the date is changed to the previous day "2018/10/11", in all the period from 0:00-0:59 to 23:00-23:59 (from 0:00 to 24:00), the past state (history of the use amount) is displayed.

In other words, the display processing engine 88 generates a display screen in which a leak integrated amount in each day-and-time section to be determined on the basis of each total leak integrated amount in each day-and-time section corresponding to a display range (period range) specified via the operation button 42, in the total leak integrated amount in association with the time stored in the logging memory 74, is graphically displayed at a position of the corresponding day-and-time section of the display graph.

To set this display range (period range), in other words, to set the time width, the menu button 40 is operated in accordance with the icon 116 of a sub-menu displayed in the footer display region 38c to select the sub-menu, and the setting can be made from the displayed sub-menu. This setting change can be made during the flow rate measurement being operated, and the setting change of the display range is immediately reflected to the graph display the leak integrated amount. In the sub-menu, for example, selection choices of "day", "month", and "year" are displayed, and the user may be caused to select one from the three selection choices.

FIG. 21 illustrates a display screen that simultaneously displays the use amount in the display range, and the use amount and the leak integrated amount corresponding to each day-and-time section (in the illustrated example, for every continuous one hour). The total use amount in the display range is numerically displayed in a lower portion of the main display region 38a. The use amount corresponded to each day-and-time section is classified by color and displayed as one bar graph corresponding to each day-and-time section and including a leak integrated amount for every continuous one hour, in an upper portion of the main display region 38a. A numerical value of the use amount in the display range is displayed in the upper portion of the main display region 38a, indicates a use amount (flow amount integrated from 0:00 to the relevant time) in a time width from the start of the display range to the relevant time, and corresponds to the use amount corresponding to each day-and-time section being integrated, and the transition of the use amounts is displayed as a line graph LG.

The leak integrated amount that is superimposed and displayed with the use amount corresponding to each day-and-time section is an integrated value of the leak flow amount in each day-and-time section, and is displayed as a bar graph. In the graph display, the leak integrated amount and the use amount are displayed by being aligned with the common graph axis, and are preferably displayed in different colors. In other words, the superimposed display of the use amount and the leak integrated amount is configured so as to have the common display range, and the common first longitudinal axis at one end of the display range.

As mentioned as the above, the display processing engine 88 generates a display screen in which a use amount to be determined on the basis of the latest total integrated flow amount, in the total integrated flow amount held in the total integrated flow amount buffer 84 and the total integrated flow amount in association with the time stored in the logging memory 74, is graphically displayed at a position of the corresponding day-and-time section, and a leak integrated amount to be determined on the basis of the total leak integrated amount held in the total leak integrated amount buffer 86 and the latest total leak integrated amount in the total leak integrated amount in association with the time stored in the logging memory 74, is graphically displayed at a position of the corresponding day-and-time section.

The total integrated flow amount held in the total integrated flow amount buffer 84 and the total leak integrated amount held in the total leak integrated amount buffer 86 are updated from time to time and from moment to moment, and the display processing engine 88 generates a display screen in which the integrated flow amount and the leak integrated amount are graphically displayed at a position of the corresponding day-and-time section on the basis of the updated total integrated flow amount and total leak integrated amount. The total integrated flow amount, the total leak integrated amount, and the display screen are updated, so that the bar graph of the use amount and the leak integrated amount displayed in the current day-and-time section is extended from time to time and from moment to moment in accordance with the update.

Moreover, the display processing engine 88 generates a display screen in which the use amount in each day-and-time section to be determined on the basis of each total integrated flow amount of each day-and-time section corresponding to the display range, in the total integrated flow amount in association with the time stored in the logging memory 74, is graphically displayed at a position of the corresponding day-and-time section, and a leak integrated amount in each day-and-time section to be determined on the basis of each total leak integrated amount in each day-and-time section corresponding to the display range, in the total leak integrated amount in association with the time stored in the logging memory 74, is graphically displayed at a position of the corresponding day-and-time section. As a result, each use amount and each leak integrated amount corresponding to the past each day-and-time section, and the use amount and the leak integrated amount corresponding to the current day-and-time section are simultaneously displayed with high regularity.

The use amount in the display range to be displayed by the line graph LG (FIG. 21) is displayed as the percentage when a use amount serving as a target, which is set in advance by the user, is set as 100, and is configured to have a first longitudinal axis VL1 (unit: $m^3$) at one end and a second longitudinal axis VL2 (unit: %) at the other end, which have different units. A use amount serving as a target is preferably displayed, and in this case, the target use amount may be displayed by a transverse dashed line, for example. As for the use amount and the leak integrated amount in each day-and-time section, which are displayed as a bar graph, similarly, target values of the use amount and the leak integrated amount may be displayed as transverse dashed lines. In FIG. 21, "Use" indicates the target value of the use amount, and "Leak" indicates the target value of the leak integrated amount.

The use amount in the display range and the use amount and the leak integrated amount in each day-and-time section are referred to the two longitudinal axes VL1 and VL2 having different units. However, simultaneously displaying target values that refer to the different longitudinal axes may make it difficult to grasp which longitudinal axis is referred at a glance. Therefore, the target use amount relative to the use amount in the display range that is displayed as the percentage is displayed as 100 in the second longitudinal axis VL2 as an alternative, and the color of the line in the line graph LG indicating the use amount in the display range may be differed between above and below the target use amount Use as a boundary, depending on whether the target use amount is exceeded. The different colors may be used for the use amount and the leak integrated amount in each day-and-time section and the display of each target value.

The use amount to be numerically displayed in the lower portion of the main display region 38a may be the total use amount (flow amount integrated from 0:00 to the current time) in the display range. In other words, the total amount of each use amount in the use amount graph that is displayed above is numerically displayed.

The screen display in FIG. 22 indicates a leak rate. The leak rate means a ratio of the leak amount in the display range relative to the use amount or the integrated flow amount. This leak rate is numerically displayed, and the ratio of the use amount and the leak amount is preferably displayed in an annular shape.

The calculation of a leak amount can be obtained by the following method. In other words, a flow rate is measured, a fluid non-use period and a fluid use period are distinguished on the basis of the measured flow rate, and on the basis of the flow rate in the fluid non-use period, a leak amount in the fluid non-use period is determined, and the determined leak amount is temporarily held in the total leak integrated amount buffer 86. Note that, when a fluid non-use period and a fluid use period are distinguished on the basis of the measured flow rate and the fluid use period is distinguished, the total leak integrated amount to be held in the leak amount buffer 86 is not updated.

A leak integrated amount is obtained in the fluid non-use period on the basis of the leak amount to be successively updated, and a leak integrated amount is obtained in the fluid use period on the basis of the leak amount in the fluid non-use period immediately prior to the fluid use period. In other words, a leak amount is estimated on the basis of the past flow rate in the fluid non-use period, and the calculation of an leak integrated amount is performed on the basis of the determined leak amount in the fluid non-use period, the estimated leak amount in the fluid use period, and respective elapsed time. The calculated leak integrated amount updates the total leak integrated amount held in the total leak integrated amount buffer 86.

The leak amount processing engine 92 can set a first threshold for distinguishing the fluid non-use period and the fluid use period, and can distinguish the fluid non-use period and the fluid use period on the basis of the measured flow rate and the first threshold. Moreover, a warning may be issued when the leak amount has increased unusually, and a second threshold may be set for distinguishing that the leak amount has been generated to the extent to issue a warning.

In the display screen having been explained with reference to FIG. 20, it is preferable to simultaneously display the leak integrated amount in the display range, and the sum of money when the leak integrated amount is converted into a cost. In other words, in a case of the leak of compression air, an expense to be paid for the driving power of the compressor necessary for generating the compression air of the total leak integrated amount may be displayed simultaneously with the total leak integrated amount. The total leak integrated amount is displayed by being converted into the cost to enable the user to realize an economical loss with reality, so that the user will hurry to take measures against the leak.

As for the determination of the leak amount, for example, when all the devices that use the compression air in the factory as a drive source are stopped, if the compression air is flowing through the pipe P at that time, the flow can be estimated due to the leak. However, the period when all the devices can be intentionally stopped is limitedly ensured in the middle of the night or on a holiday, for example, so that the detection and the estimation of the leak amount is not necessarily easy.

Figure 23:
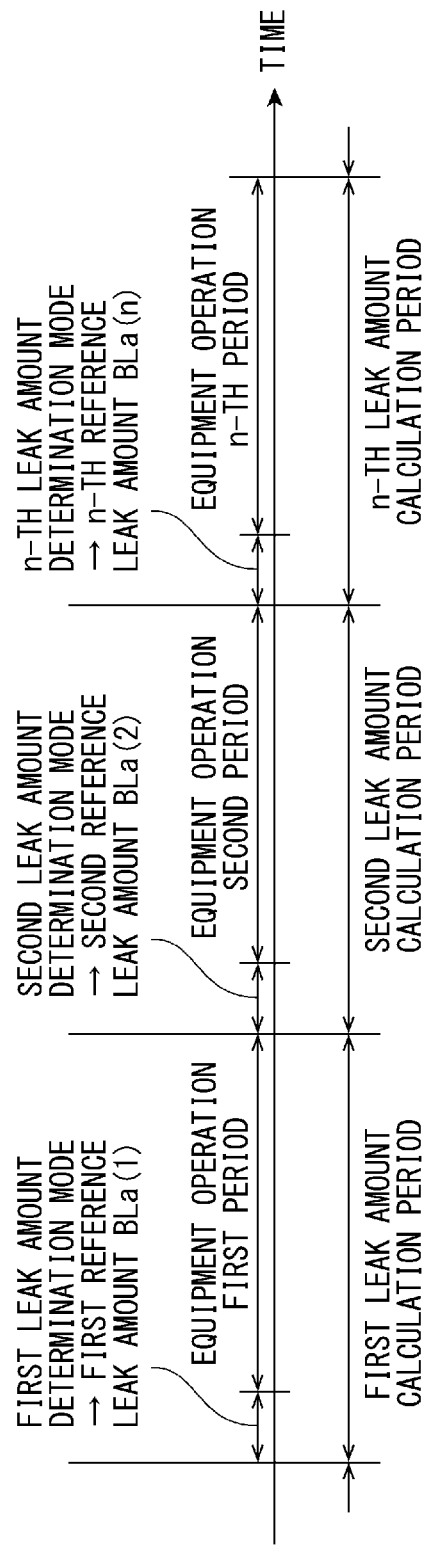
FIG. 23 is a time chart illustrating steps of determining a reference leak amount on the basis of a measured flow rate, and obtaining a leak amount including the time when the equipment is being operated.

FIG. 23 is a time chart in which a leak amount serving as a reference is determined when the constant condition is established, and on the basis of this determined leak amount, a total leak integrated amount in a period including the period when the equipment is operated is calculated. An overview will be described with reference to FIG. 23, when the constant condition is established, a leak amount determination mode is started. As the constant condition, a threshold with which the factory equipment is considered to be in a nonoperating state is set. This leak amount determination mode is continued until the factory equipment is operated next, in other words, until the constant condition is not established. A second condition for distinguishing that the factory equipment has operated may be set, and the fact that the factory equipment has operated may be distinguished on the basis of the second condition. The leak amount obtained in the leak amount determination mode is used for the calculation of the leak integrated amount during the leak amount determination mode period and the operation period of the factory equipment immediately after that. Preferably, the leak integrated amount is obtained for every day-and-time section described above, and the leak integrated amount for every section is displayed. As a leak amount during the operation period of the factory equipment, a leak integrated amount that corresponds to the abovementioned leak amount may be obtained, or a leak integrated amount may be obtained by detecting an internal pressure in the pipe P during the operation period of the factory equipment, and using the value corrected based on this internal pressure.

As a modification example, as for the determination of the leak amount, when the measured flow rate is less than a leak threshold, it is determined that the compression air is in status of not being used, in other words, the factory equipment becomes in a nonoperating state, an average value is calculated during a period (non-use period) when the measured flow rate is less than a leak threshold, for example, for every prescribed period, for example, for every 90 seconds, this average value as a leak amount is successively updated, and from the time when the measured flow rate is more than a leak threshold and to the time when it is less than the leak threshold next, it can be considered that the lastly updated leak amount may be generated. Also in this case, on the basis of the leak amount obtained during the non-use period having been distinguished on the basis of the leak threshold, a leak integrated amount during this non-use period and a leak integrated amount for every day-and-time section during the operation period of the factory equipment after the non-use period has been moved to the use period are obtained, and these leak integrated amounts for every section are used to the calculation of a leak amount to be displayed. Preferably, the leak integrated amount is obtained for every day-and-time section described above, and the leak integrated amount for every section is displayed. Also in this modification example, when the leak amount to be successively updated is more than a prescribed abnormality threshold during the non-use period, and assuming that some sort of abnormality occurs, a warning may be output.

In addition to the abovementioned leak amount determination that is automatically performed, a second leak amount determination mode in which the leak amount is determined on the basis of a timing input from the outside may be included. During the second leak amount determination mode, the leak amount processing engine 92 suspends the automatic update of the leak amount by the fluid non-use period and the fluid use period being distinguished based on the measured flow rate. During the second leak amount determination mode, on the basis of the timing input from the outside, for example, a trigger signal from an external apparatus and a mode change instruction from the user via the operation unit, the flow rate acquired from the instantaneous flow rate buffer 82 when this timing input from the outside has been made, as a leak amount, is sent to the total leak integrated amount buffer 86, and the leak amount to be held in the total leak integrated amount buffer 86 is updated. When the second leak amount determination mode is ended, the automatic update of the leak amount by the fluid non-use period and the fluid use period being distinguished based on the measured flow rate is executed.

The above-mentioned leak amount determination mode will be further specifically described with reference to FIG. 23, and on the basis of the measured flow rate and a threshold, when the measured flow rate is less than the threshold, becomes the first leak amount determination mode. When the measured flow rate is more than the threshold, the first leak amount determination mode is cancelled. During the first leak amount measure mode period, the flow rate is successively measured, and an average value thereof is determined as a first reference leak amount BLa(1). A leak amount in a first leak amount calculation period including an equipment operation first period after the first leak amount determination mode has been canceled and during the first leak amount determination mode period is calculated on the basis of the first reference leak amount BLa(1). Thereafter, this processing is repetitively executed.

When the measured flow rate unusually increases during the leak amount determination mode, in other words, when the measured flow rate is exceeded the abnormality detect threshold, a warning may be output.

Figure 24:
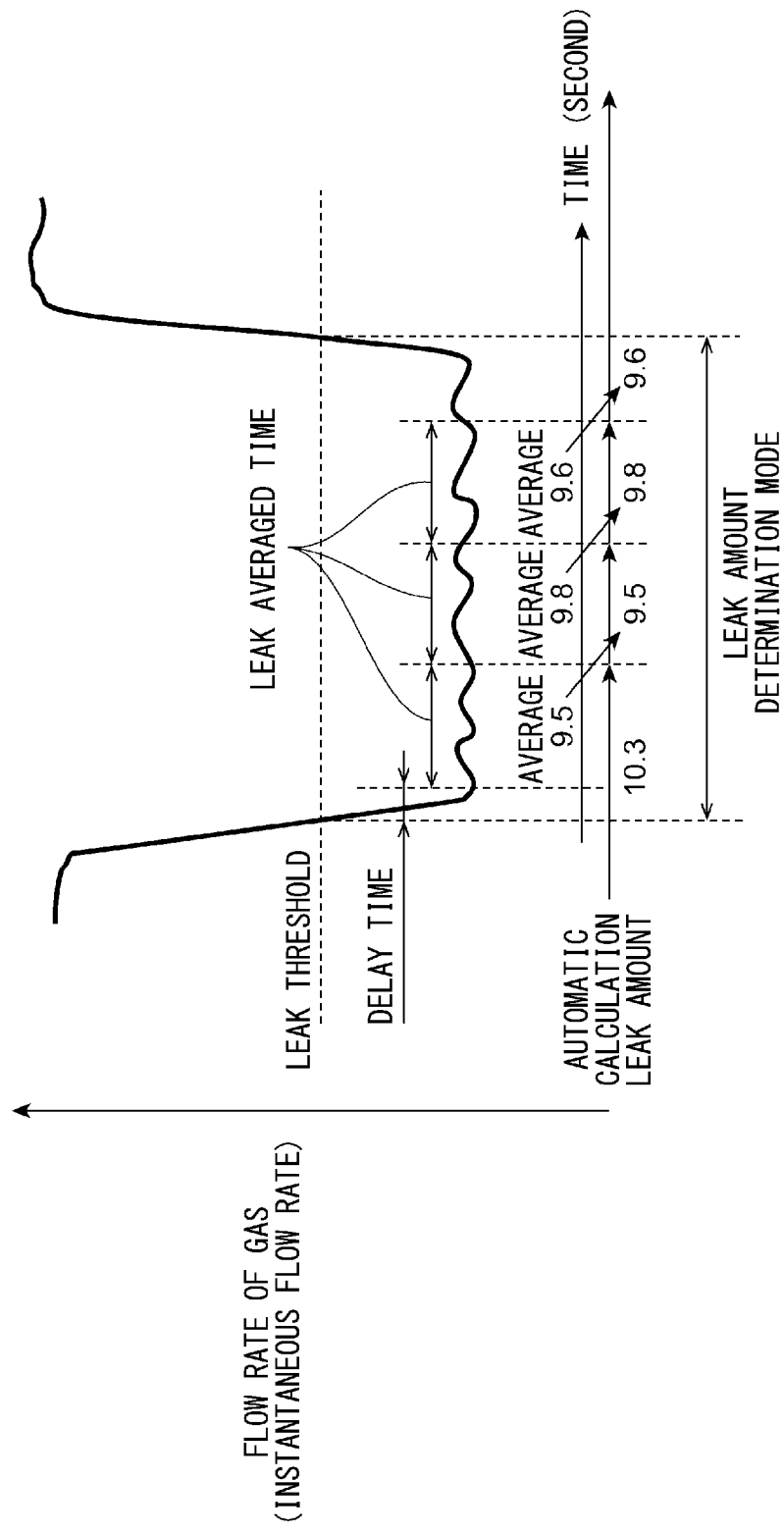
FIG. 24 is a conceptual diagram of processing in a leak amount determination mode in which a reference leak amount is determined.

With reference to FIG. 24, processing in the leak amount determination mode will be described. When the compression air is used under the normal operation, the flow rate is certainly more than the abovementioned threshold. Therefore, a value less than the flow rate of the compression air under the normal operation is considered to be a leak is set as a threshold. With this leak threshold, regardless of the period when the factory equipment is operating or a non-operation period, it is possible to distinguish, on the basis of the measured flow rate, whether the compression air is used, in other words, whether the factory equipment is operating.

When the measurement flow rate is less than a leak threshold, it is determined that a state where the compression air is not used at all starts, and the leak amount determination mode is started. In the leak amount determination mode, a plurality of flow rate values continuously measured in the stage where the leak detection delay time or more is elapsed and the flow rate becomes stable, are averaged, and the average value is determined as a leak flow rate BLa.

Preferably, an averaging period is set in advance, a first average value ("9.5" illustrated in FIG. 24) in a first averaged time is stored in a memory, and the first average value in the memory is updated with a second average value ("9.8" illustrated in FIG. 24) in the second averaged time. Next, the second average value in the memory is updated with a third average value ("9.6" illustrated in FIG. 24) in a third averaged time. The first to third average values in the first to third periods of the respective time sections can be used for making them as a graph. When the leak amount determination mode is finished, the average value having been continuously updated during the leak amount determination mode is set as a leak flow rate BLa(n). Continuously updating the leak flow rate BLa(n) in time series allows the most possible leak amount included in the compression air use amount under the on-site operation to be obtained. As the leak amount during the operation, a value in which the reference leak flow rate BLa(n) is corrected with the pipe internal pressure and the environment temperature may be employed.

Moreover, preferably, a value of the leak threshold may be updated on the basis of the leak flow rate BLa(n), and the leak threshold may be optimized. In other words, when the reference leak flow rate BLa(n) changes more than a predetermined value, the threshold change may be instructed, and when this instruction is accepted, the threshold stored in the memory may be updated to change the threshold.

Figure 25:
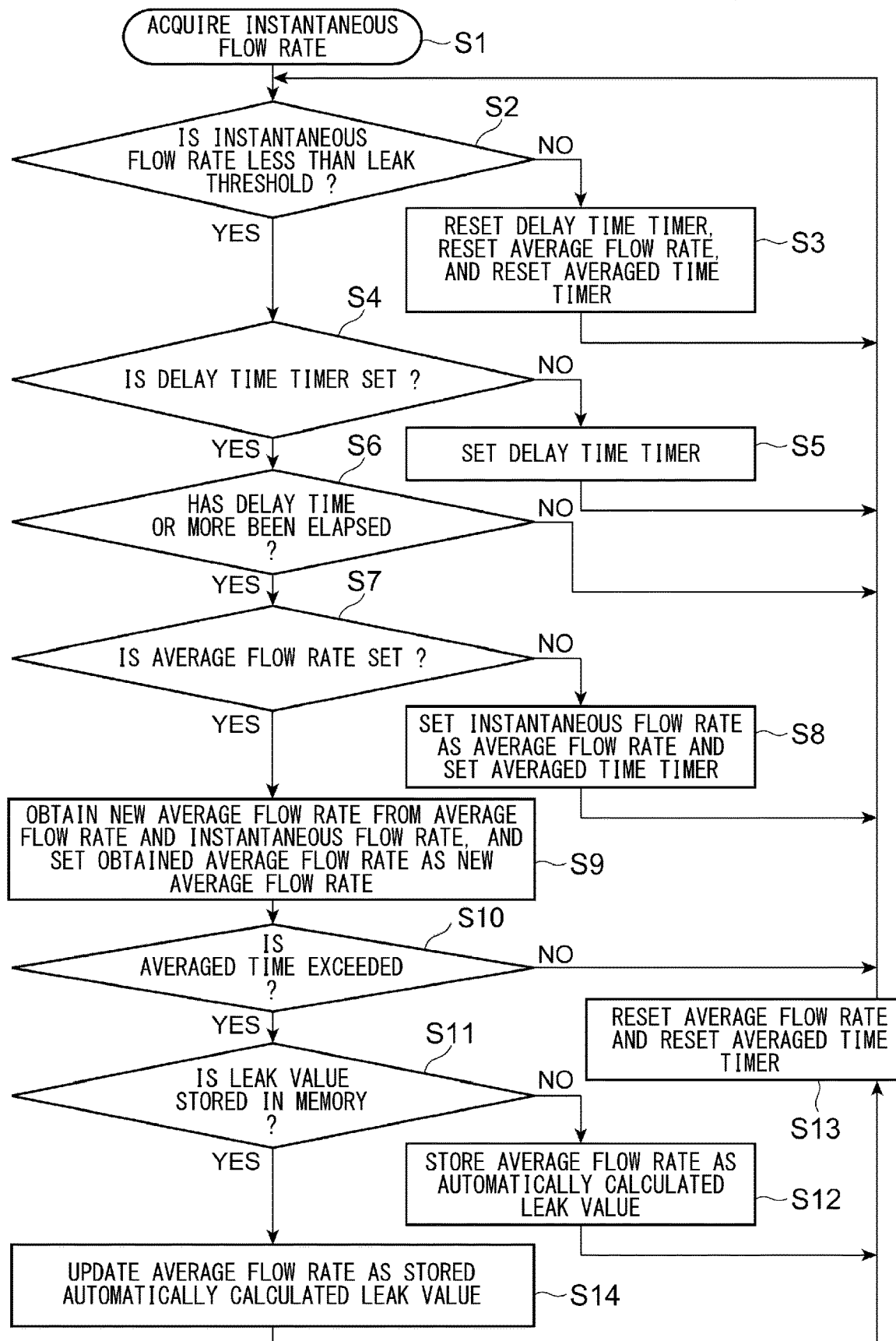
FIG. 25 is a flowchart for explaining a procedure of obtaining a reference leak amount.

The further specific explanation is made on the basis of the flowchart in FIG. 25. At Step S1, an instantaneous flow rate, in other words, a current flow rate is acquired. At next Step S2, a determination is made whether this instantaneous flow rate is less than a leak threshold, and if NO (instantaneous flow rate is plenty), the processing is proceeded to Step S3, and the delay time timer, the average flow rate, and the averaged time timer are reset. If YES at Step S2, the instantaneous flow rate is a little, the processing is proceeded to Step S4, and a determination is made whether the delay time timer is set. The set time of the delay time timer is one minute, as an example. If NO at Step S4, the processing is proceeded to Step S5, and the delay time timer is set. At Step S4, if the delay time timer is set, the processing is proceeded to Step S6, and a determination is made whether the delay time has been elapsed, if the delay time has been elapsed, the value of the instantaneous flow rate is settled, the processing is proceeded to Step S7.

At Step S7, a determination is made whether the average flow rate is set, If NO, the processing is proceeded to Step S8, and the instantaneous flow rate is set as an average flow rate and an averaged time timer is set. The set time of the averaged time timer is one minute, as an example. At Step S7, if YES, in other words, if the average flow rate is set, the processing is proceeded to Step S9, an average flow rate is newly obtained from the average flow rate and the instantaneous flow rate, this obtained average flow rate is set as a new average flow rate. At next Step S10, a determination is made whether the averaged time is exceeded: if YES, the sufficient averaging has been executed, the processing is proceeded to Step S11, and a determination is made whether the leak value is stored; and If NO, the processing is proceeded to Step S12, and the leak value is stored in the memory. On the other hand, if YES, the processing is proceeded to Step S14, and the average flow rate is updated as a stored leak value, and subsequently, at Step S13, the average flow rate is reset and the averaged time timer is reset.

With the abovementioned processing, when the flow rate is stable at a slight value, an average value thereof is regarded as a leak value, and is successively updated, so that for example, in the middle of the night, a possible leak value can be automatically obtained. Further, the leak value obtained in this manner may be used in the above-mentioned screen display.

The above-mentioned the flow meter Fm is provided with the logging memory 74 to which the power supply is supplied all the time and in which the RTC 68 manages the time, so that it is possible to construct an integral system with no limitation of the constant connection and the like with respect to the monitoring apparatus.

Figure 26:
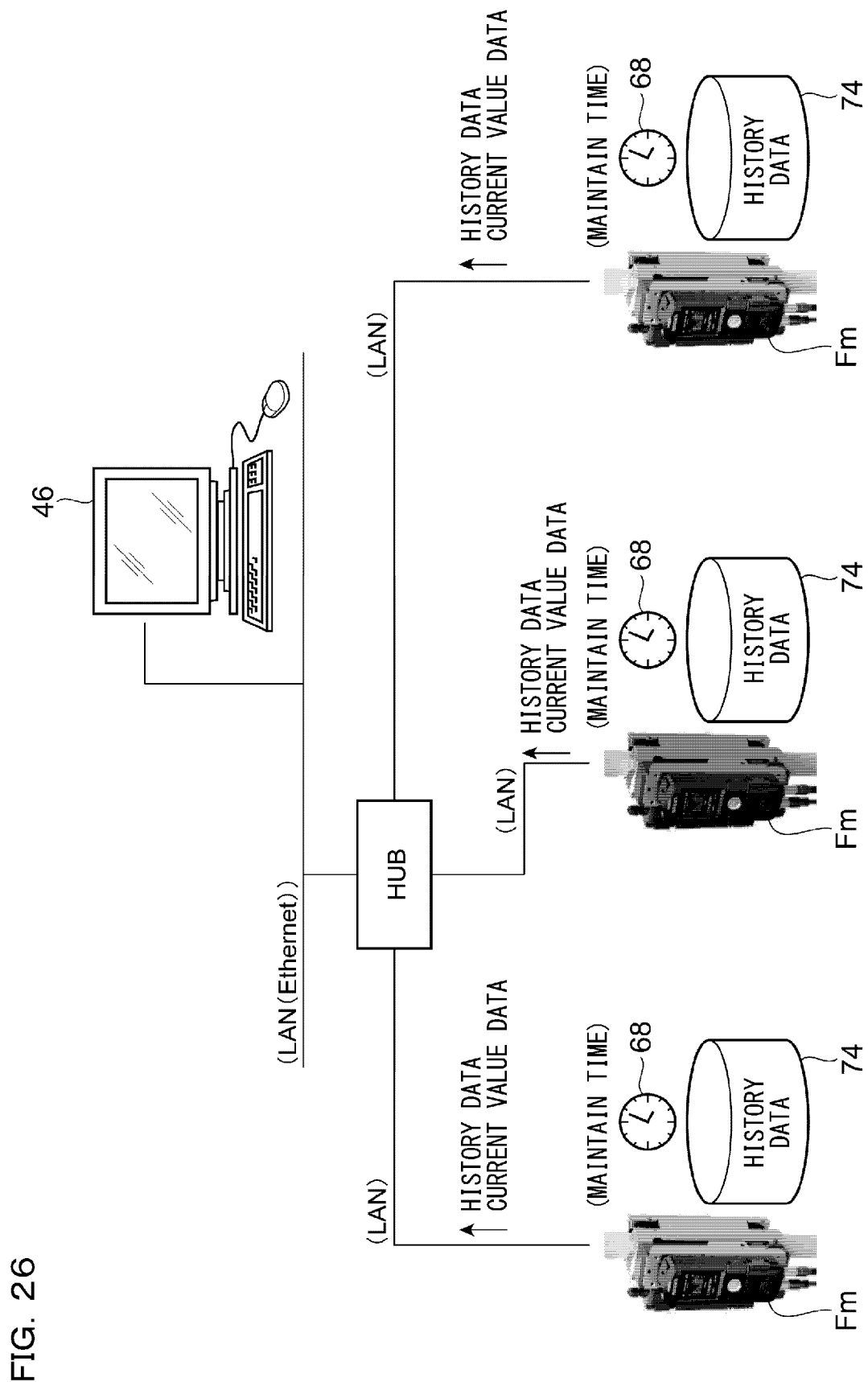
FIG. 26 is an overall system diagram in which a plurality of flow meters are connected to a PC via a network, and a display screen of the PC is generated on the basis of data stored in each flow meter.

With reference to FIG. 26 and FIG. 4, the PC 46 that operates as a monitoring apparatus is connected to an industry communication network, for example, a LAN, to which the abovementioned flow meter Fm is connected, successively acquires current data from the desired the flow meter Fm on the basis of the monitoring screen setting data set in advance, acquires history data and time information of the RTC 68 stored in the logging memory 74, and provides, on the basis of the acquired current data and history data, and the monitoring screen setting data set in advance, a monitoring screen including information necessary for a person in charge. The current data and history data to be acquired from the flow meter Fm include the instantaneous flow rate, the integrated flow amount, the use amount, the leak amount, and the leak integrated amount, or data for calculating these data, for example, the total integrated flow amount and the total leak integrated amount, and one or a plurality of data from these data is set as the data to be acquired from the flow meter Fm.

In other words, data from each flow meter Fm that is successively updated from past data to the current data functions as master data. Accordingly, the PC 46 does not need to be constantly connected to each flow meter Fm, nor does not need to manage the measurement time.

The PC 46 that operates as a monitoring apparatus includes a setting mode for editing and creating a monitoring screen, and an operation mode for displaying a monitoring screen on the basis of the setting data set in the monitoring screen setting mode.

In the setting mode, the PC 46 accepts a designation of a display component configuring the monitoring screen. For example, when the designation of a graph display component as a display component and the designation of a position on the monitoring screen by the user are accepted, the graph display component is disposed at the designated position on the monitoring screen. With respect to this graph display component, setting of the flow meter Fm serving as a display target and data serving as a display target is accepted. For example, setting of address information on the flow meter Fm serving as a display target, and the use amount and the leak amount as data as serving a display target is accepted. The PC 46 can accept the designation of a plurality of display components, and generates monitoring screen setting data including the setting of each display component on the basis of the designation by the user.

In the operation mode, the PC 46 acquires data as a target of the flow meter Fm serving as a display target on the basis of the setting of each display component in the monitoring screen setting data. When data as a target is the use amount and the leak amount, the total integrated flow amount and the total leak integrated amount in association with the time stored in the logging memory 74 are acquired from the flow meter Fm serving as a display target, and the total integrated flow amount and the total leak integrated amount to be successively updated are acquired for every one millisecond, for example. The PC 46 displays, on the basis of the total integrated flow amount and the and total leak integrated amount in association with the time, and the total integrated flow amount and the total leak integrated amount to be successively updated, a bar graph illustrating the use amount for every time section at a set position on the monitoring screen in accordance with the setting of each display component in the monitoring screen setting data. The bar graph corresponding to the aforementioned current time section is extended from moment to moment in accordance with the total integrated flow amount to be successively updated.

In other words, the PC 46 graphically displays, as a graph to be displayed at a set position on the monitoring screen, in the total integrated flow amount and the total leak integrated amount in association with the time stored in the logging memory 74, the use amount and the leak integrated amount in each day-and-time section to be determined on the basis of each total integrated flow amount and each total leak integrated amount in each day-and-time section corresponding to the display range, at a position of the corresponding day-and-time section. As a result, each use amount and each leak integrated amount corresponding to the past each day-and-time section, and the use amount and the leak integrated amount corresponding to the current day-and-time section are simultaneously displayed with high regularity.

The PC 46 includes templates of a graph display component and a comparison display component that are a display component configuring the monitoring screen. For example, in the template of the graph display component, the standardized width and display range (the width of the display period) in each day-and-time section are set in advance, so that only with the basic setting of the flow meter Fm serving as a display target and the setting of data serving as a display target, the setting of the graph display component can be completed.

The PC 46 accepts the setting in the setting mode, and accepts the setting also in the operation mode, with respect to the graph display component and the comparison display component that are display components configuring the monitoring screen. For example, the PC 46 accepts the setting of the flow meter Fm serving as a display target and setting of the data serving as a display target with respect to the graph display component in the setting mode, and accepts the setting of the display range (the width of the display period) with respect to the graph display component in the operation mode. As the display range, the selection of the resolution of "day", "month", "year" is accepted, and the selection of date serving as a display target is accepted. The PC 46 displays a graph in accordance with the setting on the basis of the accepted setting/selection on the monitoring screen.

A monitoring dedicated program is installed on the PC 46, so that the PC 46 functions as a monitoring apparatus having the following characteristics. (1) A plurality of templates for easy generation of a graph are prepared. (2) Setting of the flow meter Fm related to the display and the operation of the flow meter Fm can be made. (3) The display range displayed in the PC 46 is selectable from day, month, and year. (4) In the past arbitrary display range selected by the user at the PC 46 side or the display range including the current time, a comparison display is possible in the PC 46. (5) In the PC 46, a display related to the leak amount, and a simultaneous display of the leak amount and the use amount are possible. (6) Also in the PC 46, the numerical value and the graph can be simultaneously displayed. (7) During operating the flow meter Fm as a PC display target, the flow meter Fm can be arbitrarily changed. (8) The user can arbitrarily set the display range of the PC display screen. This display range can be set also during the operating period.

Figure 27:
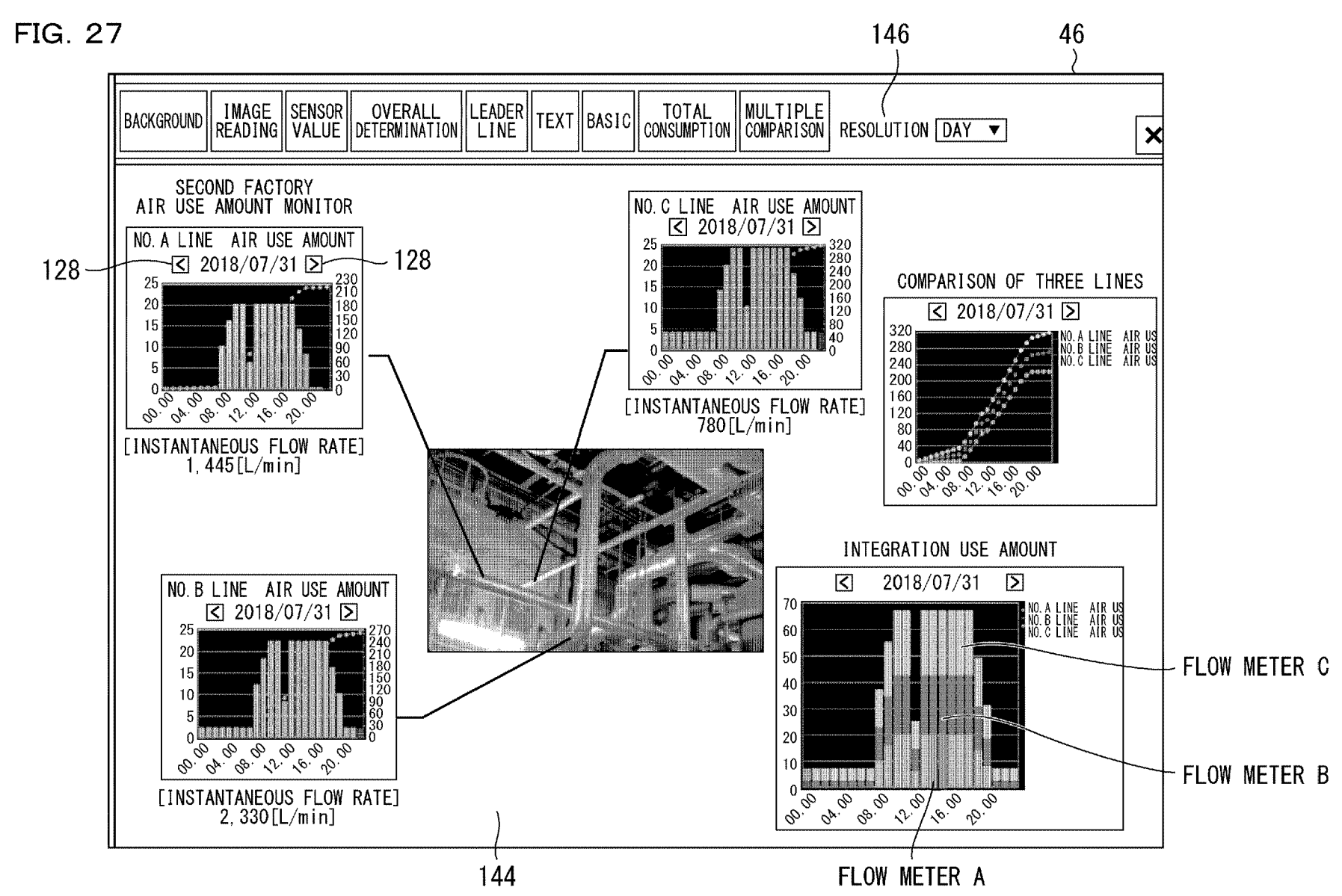

FIG. 27 illustrates one example of a PC screen display during the operation with a monitoring screen created by a user. This monitoring screen illustrates one example that can be displayed in the PC 46. In the PC display screen illustrated in FIG. 27, a part of a factory layout is displayed at a center part thereof, and the displayed drawing layout includes three flow meters Fm that are mounted in lines from A to C, as for each flow meter Fm, the flow amount and the current instantaneous flow rate measured in each flow meter Fm is displayed as a bar graph for every one hour, and the use amount in the display range is simultaneously displayed as a line graph. In a graph of each flow meter Fm as a monitoring target, a date change icon 128 is embedded, and the user operates this date change icon 128 to make it possible to display graphs of different dates, such as the previous day and the next day.

In the PC monitoring screen illustrated in FIG. 27, the use amounts in the display ranges in the three flow meters Fm are displayed by comparison as the respective line graphs, and the text "comparison of three lines" is assigned to this comparison display. Moreover, in the illustrated PC monitoring screen, in addition, the use amounts in the display ranges of the three flow meters Fm for every one hour are displayed as one integrated bar graph classified by color for every hour, and the text "integration use amount" is assigned to this graph display. In the graphs of the "comparison of three lines" and the "integration use amount", similar to the above-mentioned graph display of each flow meter Fm, the date change icon 128 is embedded, the user operates the date change icon 128 and the PC 46 accepts it, so that the monitoring screen is changed to display graphs of different dates, such as the previous day and the next day.

Figure 28:
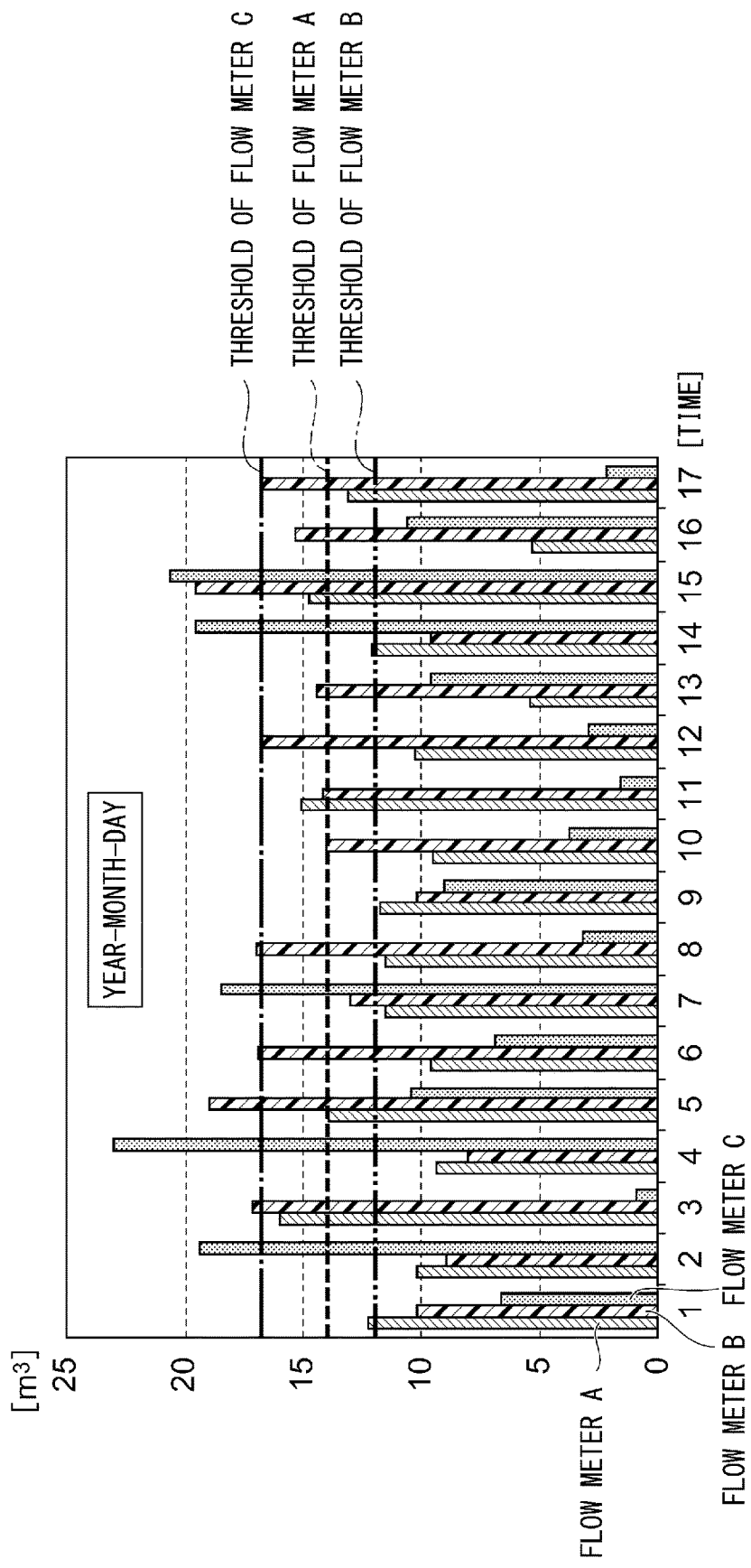
FIG. 28 is a diagram for explaining one example of a graph display created by the monitoring PC on which the dedicated program is installed.

FIG. 28 illustrates another example in which when the plurality of flow meters Fm are monitor targets, bar graphs of these are integrated and displayed. In the graph display illustrated in FIG. 28, in the display range selected by the user, bar graphs for every one hour of the respective flow meters Fm are arranged side-by-side and displayed by comparison, and preferably, thresholds of the respective flow meters Fm are displayed as transverse lines. For example, during the operating, when the flow meter Fm as a display target is changed, in the monitoring screen, in response to this change, the display is immediately changed to the graph display related to the flow meter Fm after the change.

Figure 29:
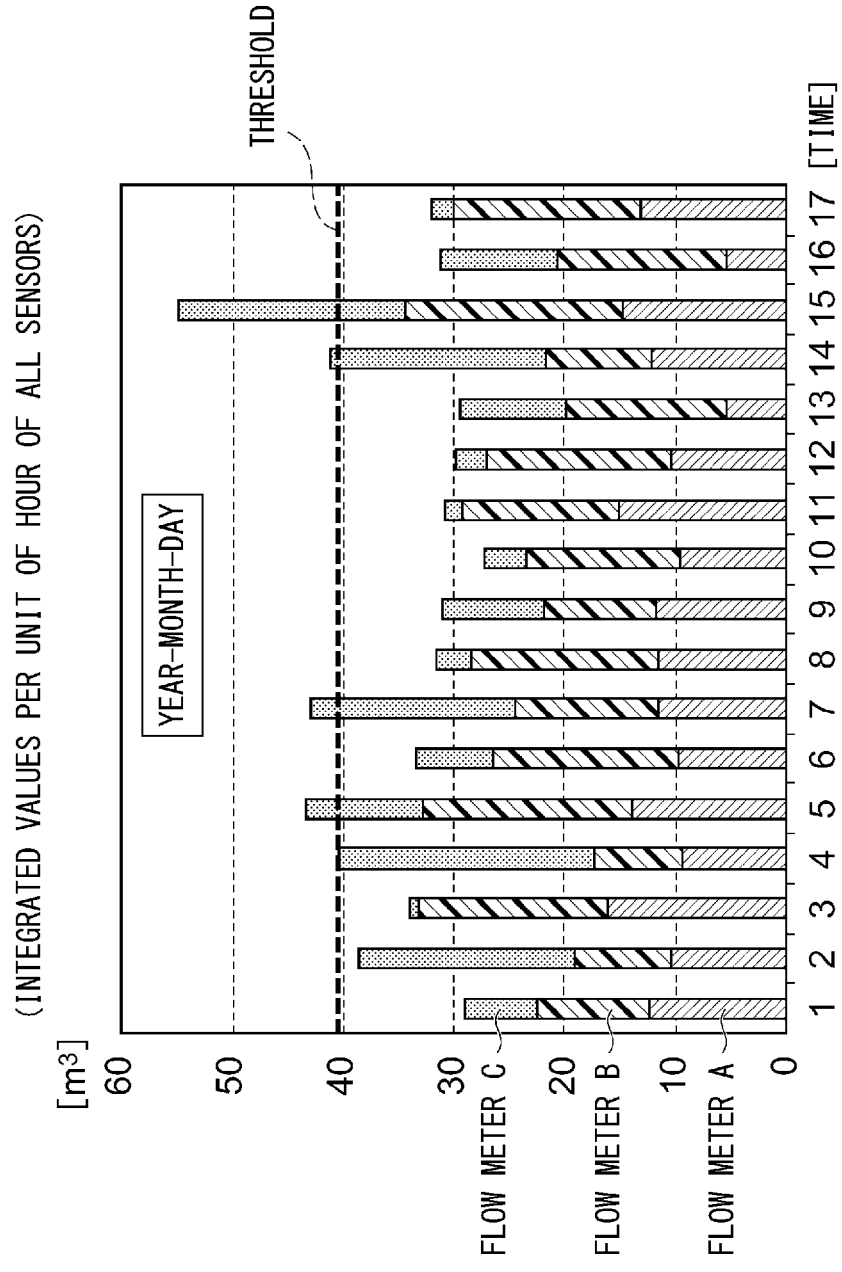
FIG. 29 is a diagram for explaining another example of a graph display created by the monitoring PC on which the dedicated program is installed.

In the display screen of FIG. 29, in the display range selected by the user, a comparison display is made by one bar graph being classified by color for every one hour, and in this display example, one threshold of the flow meter Fm selected by the user is displayed as a transverse line.

With reference to FIG. 5 mentioned above, a function executed by a dedicated application in the PC 46 will be described. The PC 46 includes a communication control unit 130 that accepts data from each flow meter Fm, and the communication control unit 130 at the PC side performs initial communication and fixed cycle communication with a communication control unit 92 of each flow meter Fm. In the initial communication, the communication control unit 130 is used when the PC 46 acquires data in the logging memory 74 of each flow meter Fm, and information related to the display search having been explained with reference to FIG. 19 and the editing of logging data. In the fixed cycle communication, on the basis of time information of the RTC 68 of the flow meter Fm, communication between the PC 46 and each flow meter Fm is performed at the same timing with the flow meter Fm and for every one millisecond, and update data and instantaneous flow rate data of the flow meter Fm is read.

The data and information acquired from the flow meters Fm being connected are stored in a replication logging memory 132, and is temporarily held in a replication buffer 134. A display screen generation unit 136 generates a display screen related to the flow meter Fm that is requested to be displayed, from the replication logging memory 132 and the replication buffer 134. In other words, the PC 46 replicates data in the logging memory 74 of each flow meter Fm into the replication logging memory 132 in the initial communication, so that it is possible to generate a PC monitoring screen on the basis of the data in the replication logging memory 132.

When the PC 46 changes the display of the PC monitoring screen to the graphs with the different dates such as the previous day and the next day, a date change icon 138 is operated to change the PC monitoring screen on the basis of the data in the replication logging memory 132. The monitoring screen generated by the display screen generation unit 136 is displayed on a PC display unit 144 during the operation mode.

When the reading by the PC 46 is suspended, for example, when the operation of the PC 46 is stopped, the reading is immediately executed when the operation of the PC 46 is restarted, data in the replication logging memory 132 is updated and a replication instantaneous flow rate buffer is updated, the updates are reflected to the display screen generation unit 136, and the PC monitoring screen is updated.

Figure 30:
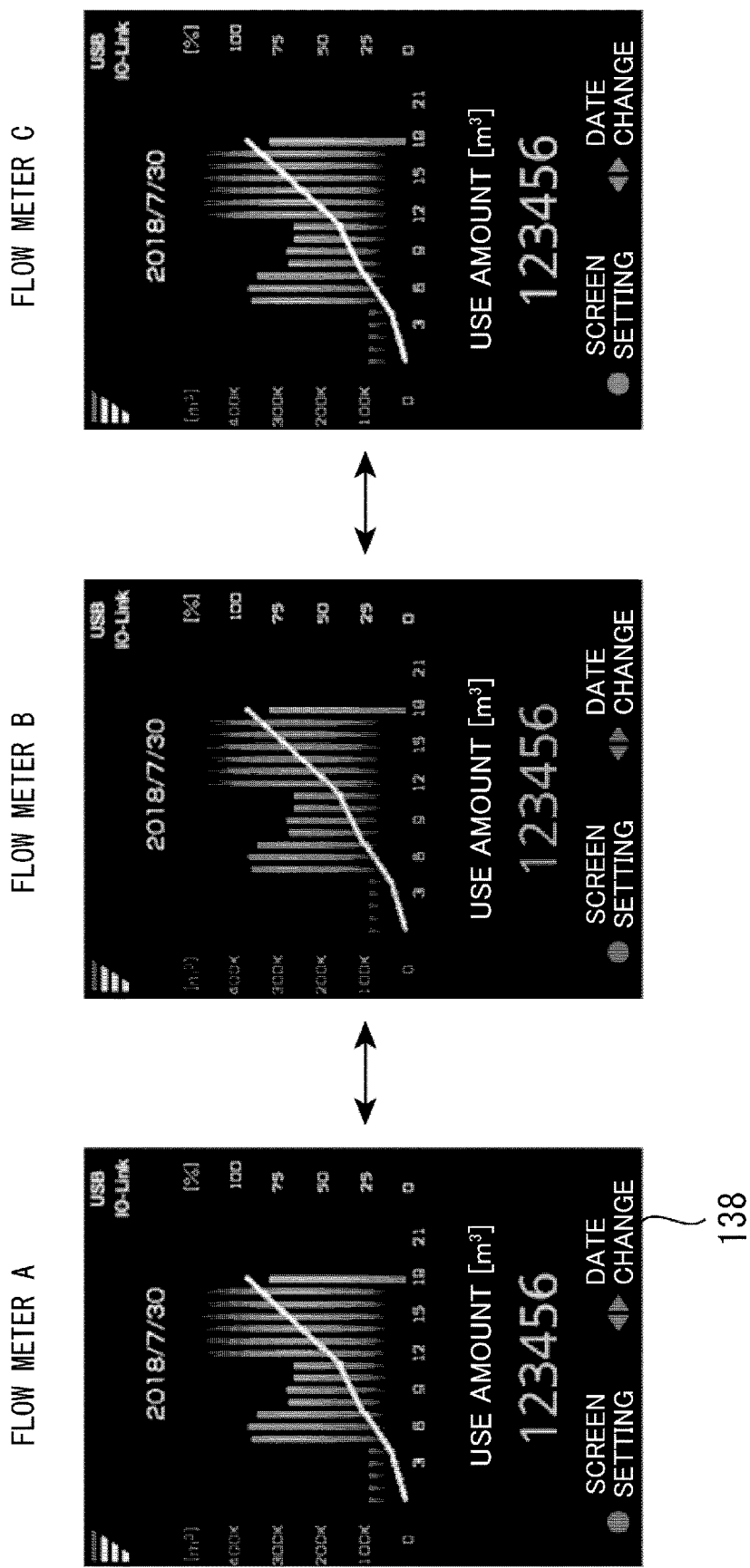
FIG. 30 is a diagram for explaining one example of templates that are prepared in the dedicated program having been installed on the monitoring PC.

In the PC dedicated program, as mentioned in the above, a template for displaying a standardized graph is prepared. FIG. 30 illustrates one example of a template part. The user assigns this template part to each flow meter Fm, the plurality of flow amounts and/or the leak amount of the flow meters Fm as display targets can be monitored on the PC display. Further, in this display, the graph display is updated each time the communication unit 130 accepts update data from each flow meter Fm.

In the monitoring screen, a display range selection menu called the "resolution" 146 is prepared (FIG. 27). The user can select one from "day", "month", and "year" by operating the resolution menu 146. When the PC 46 accepts a change of the display range by the user, only the display range of the relevant graph may be changed, or the display ranges of all the graphs displayed on the monitoring screen may be collectively changed. The change of the display range is possible during the operation mode, and the setting is possible during the operation mode with respect to the display component having been set in the setting mode, thereby making it possible to reduce come-and-go between the setting mode and the operation mode.

With reference to FIG. 31, an editing function in which a user uses the PC 46 to create a monitoring screen in the setting mode will be described. The drawing is similar to the monitoring screen having been explained with reference to FIG. 27, and an editing function included in a dedicated program including the operation when the user edits the monitoring screen illustrated in FIG. 27 will be described.

With reference to FIG. 31, in the setting mode, the PC 46 accepts a designation of display components configuring the monitoring screen. When intending to dispose an image component as a display component, the user operates an image capturing menu 154. The designation of an image component as a display component and the designation of a position on the monitoring screen by the user are accepted, the image is disposed at the designated position on the monitoring screen. As for this image component, selection of an image to be allocated is accepted, and an image component on which a factory layout 152 that is the selected image is displayed is disposed at a designated position on the monitoring screen.

When intending to dispose a leader-line component as a display component, the user operates a leader-line menu 158. When the designation of a position on the monitoring screen is accepted, a leader-line component corresponding to the designation of the position and the shape is disposed on the monitoring screen.

When intending to dispose a graph display component as a display component, the user operates a total consumption menu 160. When the designation of the graph display component as a display component and the designation of a position on the monitoring screen by the user are accepted, a graph display component is disposed at the designated position on the monitoring screen. With respect to this graph display component, setting of the flow meter Fm serving as a display target and data serving as a display target are accepted. For example, setting of IP address information on the flow meter Fm serving as a display target, and the use amount as data as serving a display target are accepted.

When intending to dispose a comparison display component as a display component, the user operates a multiple comparison menu 166. When the designation of the comparison component as a display component and the designation of a position on the monitoring screen by the user are accepted, a comparison display component is disposed at the designated position on the monitoring screen. With respect to this comparison display component, a plurality of the flow meters Fm serving as display targets and the setting of the data serving as a display target are accepted. For example, IP address information 142 (FIG. 5) on each of the plurality of the flow meters Fm serving as display targets and the setting of the use amount as data serving as a display target are accepted.

Moreover, when intending to dispose a text display component as a display component, the user operates a text menu 168. When the designation of the text component as a display component and the designation of a position on the monitoring screen by the user are accepted, a text display component is disposed at the designated position on the monitoring screen. As for this text display component, the content of the text to be displayed is accepted, the text display component on which the content of the accepted text is displayed is disposed at a designated position on the monitoring screen. The content of text includes a character string, a number, and a unit.

The dedicated program that can be installed on the PC 46 has the drawing and editing functions as mentioned as the above, for example, a necessary component and template displaying a factory layout are prepared, and the PC 46 can arbitrarily and easily create a monitoring screen that the user desires. The PC 46 can accept the designation of a plurality of display components, and generates monitoring screen setting data including the setting of each display component on the basis of the designation by the user.

In the foregoing, the preferable embodiment in which the present invention is applied to the clamp-on type ultrasonic flow meter has been explained, however, the present invention is not limited thereto. For example, as the gas flow meter, a thermal flow meter and a vortex flow meter have been known. The present invention can be suitably applied to not only these gas flow meters, but also the present invention can be suitably applied to a flow meter that is targeted for a fluid.

What is claimed is:

1. A monitoring apparatus for monitoring a fluid flow rate measured by
one or more flow meters each including:
a flow rate measurement unit configured to operate by electric power to be supplied from an external power supply, and measure a fluid in a pipe;
a real-time clock configured to be connected to a power supply circuit that provides electric power when the electric power is not supplied from the external power supply, hold current day-and-time data regardless of whether the electric power is supplied from the external power supply, and update the current day-and-time data in response to current day-and-time;
a calculation unit configured to calculate, on the basis of the flow rate measured by the flow rate measurement unit and the current day-and-time data obtained from the real-time clock, integrated flow amount data for every day-and-time section set in advance; and
a storage unit configured to store therein the integrated flow amount data for every calculated day-and-time section in association with the day-and-time section, and
the monitoring apparatus connected to the one or more flow meters, the monitoring apparatus comprising
a communication control unit configured to accept the integrated flow amount data for every day-and-time section stored in the storage unit, and the flow rate measured by the flow rate measurement unit, each from the one or more flow meters;
a screen generation unit configured to generate, on the basis of the integrated flow amount data for every day-and-time section stored in the storage unit, an integrated flow amount graph screen including a day-and-time section including the current day-and-time and a plurality of day-and-time sections continuous to the day-and-time section, and graphically displaying an integrated flow amount corresponding to each day-and-time section in a past day-and-time section in the plurality of the day-and-time sections, on the basis of the integrated flow amount data for every day-and-time section set in advance; and a display unit configured to display the integrated flow amount graph screen.

2. The monitoring apparatus according to claim 1, wherein a template part corresponding to the integrated flow amount graph screen is prepared in advance.

3. The monitoring apparatus according to claim 1, further comprising monitoring screen setting data configured to designate at least one flow meter from the one or more flow meters serving as a display target, wherein when monitoring of each of the at least one flow meter designated on the basis of the monitoring screen setting data is started, the integrated flow amount data for every day-and-time section stored in the storage unit of each of the at least one flow meter is read.

4. The monitoring apparatus according to claim 1, wherein during the display by the display unit, current integrated flow amount data based on the flow rate measured by the flow rate measurement unit is graphically displayed, and when the acceptance from at least one flow meter of the one or more flow meters is suspended and is thereafter restarted, the integrated flow amount data stored in the storage unit of each of the at least one flow meter is read.

5. The monitoring apparatus according to claim 1, wherein the screen generation unit generates the integrated flow amount graph screen in a display range in which a user selects one from a group including day, month, and year.

6. The monitoring apparatus according to claim 1, said monitoring apparatus further connected to another flow meter, wherein the integrated flow amount data stored in the storage unit of each of the another flow meter and the one or more flow meters is simultaneously graphically displayed on the display unit.

7. The monitoring apparatus according to claim 1, said monitoring apparatus further connected to another flow meter, wherein the integrated flow amounts from the another flow meter and the one or more flow meters are displayed by comparison.

8. The monitoring apparatus according to claim 1, wherein a current instantaneous flow rate measured by at least one flow meter of the one or more flow meters is accepted, and a numerical display of the instantaneous flow rate and the graph display of the integrated flow amount are simultaneously displayed on the display unit.

9. The monitoring apparatus according to claim 1, wherein the graph display is possible with two display axes of different units, in the display unit.

10. The monitoring apparatus according to claim 1, wherein the storage unit is configured to further store integrated leak amount data for every day-and-time section in association with the day-and-time section, and the screen generation unit generates a leak amount screen in which, on the basis of the integrated leak amount data for every day-and-time section stored in the second storage unit, an integrated leak amount corresponding to each day-and-time section is displayed.

* * * * *